United States Patent
Singh et al.

(10) Patent No.: US 12,443,459 B2
(45) Date of Patent: Oct. 14, 2025

(54) DETECTING AND MANAGING OVERLOADED MACHINES IN A VIRTUAL DEPLOYMENT

(71) Applicant: Citrix Systems, Inc., Fort Lauderdale, FL (US)

(72) Inventors: Vikramjeet Singh, Bangalore (IN); Mukesh Garg, Bangalore (IN); Vivek Koni Raghuveer, Bangalore (IN); Syed Mansoor Pasha, Bangalore (IN); Ramnath Repakula, Bangalore (IN); Vindhya Gajanan, Bangalore (IN); P N Prathima, Bangalore (IN)

(*) Notice: Subject to any disclaimer, the term of this patent is extended or adjusted under 35 U.S.C. 154(b) by 738 days.

(21) Appl. No.: 17/667,062

(22) Filed: Feb. 8, 2022

(65) Prior Publication Data

US 2023/0205595 A1 Jun. 29, 2023

(30) Foreign Application Priority Data

Dec. 28, 2021 (IN) .............................. 202141061213

(51) Int. Cl.
*G06F 9/50* (2006.01)
*G06F 9/455* (2018.01)
*G06F 11/34* (2006.01)

(52) U.S. Cl.
CPC .......... *G06F 9/505* (2013.01); *G06F 9/45558* (2013.01); *G06F 11/3433* (2013.01); *G06F 2009/4557* (2013.01)

(58) Field of Classification Search
CPC .. G06F 9/505; G06F 9/45558; G06F 11/3433; G06F 2009/4557; G06F 9/5088; G06F 11/3409; G06F 2201/81
See application file for complete search history.

(56) References Cited

U.S. PATENT DOCUMENTS

| 12,093,709 B1* | 9/2024 | Chraim | G06F 11/3433 |
| 2012/0116831 A1* | 5/2012 | Greenspan | G06Q 30/0601 705/26.1 |
| 2019/0317869 A1* | 10/2019 | Selvaraj | G06F 11/203 |
| 2020/0366572 A1* | 11/2020 | Chauhan | H04L 41/5009 |
| 2020/0404047 A1* | 12/2020 | Kurhe | H04L 67/1004 |
| 2023/0025718 A1* | 1/2023 | Varnavas | G06F 11/302 |
| 2023/0114867 A1* | 4/2023 | Chawla | G06F 9/45558 713/2 |
| 2023/0205595 A1* | 6/2023 | Singh | G06F 11/3409 718/104 |

* cited by examiner

*Primary Examiner* — Benjamin C Wu

(57) ABSTRACT

Systems and methods for managing overloaded machines in a virtual environment are provided. A device can include one or more processors, coupled to memory. The device can receive, for time intervals, a metric of performance of hardware of a machine hosting sessions between clients. The device can identify, for the time intervals, a plurality of scores indicative of performance of the corresponding plurality of sessions. The device can trigger an action to perform on the machine or at least one of the sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals.

11 Claims, 10 Drawing Sheets

DETECTING AND MANAGING OVERLOADED MACHINES IN A VIRTUAL DEPLOYMENT

CROSS-REFERENCE TO RELATED APPLICATION

This application claims priority to and the benefit of Indian Provisional Patent Application No. 202141061213, titled "SYSTEMS AND METHODS FOR MANAGING OVERLOADED MACHINES IN A VIRTUAL DEPLOYMENT," and filed on Dec. 28, 2021, the contents of all of which are hereby incorporated herein by reference in its entirety for all purposes.

FIELD OF THE DISCLOSURE

The present application generally relates to managing network connections, including but not limited to systems and methods for alerting administrators about overload machines in virtual application and desktop (VAD) deployment.

BACKGROUND

Client devices can establish sessions with one or more machines. One or more machines can host the sessions. Individual machines can allocate computing resources to one or more sessions. Client devices can access resources from the machine via one or more established sessions.

SUMMARY

Client devices can establish sessions with one or more machines (e.g., physical or virtual machines) to access resources. Individual machines can host multiple sessions accessible to respective users using the client devices. As more users access resources via sessions hosted by a respective machine, the machine may be overloaded (e.g., resource consumption higher than resource capacity). An overloaded machine can impact the one or more sessions being hosted and the users using the sessions. However, machines can be configured to handle the high workload or resource consumption requested by client devices. In particular, individual machines with high resource consumption may not impact the performance of certain sessions, and degradation of session performance may not be caused by the overloading of the machine. Hence, it can be challenging to determine the sessions that are impacted due to the performance of the machine. Further, without correlation between machine performance and session performance, it can be difficult, erroneous, or inaccurate to select the sessions or machines and provide an action to take on the sessions or machines.

The systems and methods of this technical solution can alert administrators (admins) on overloaded machines or take actions on the overloaded machines. The systems and methods can include a device including one or more processors coupled to memory. The device can obtain data (e.g., statistical or analytics data) on individual machines and sessions hosted on the respective machines. For example, the device can identify or obtain information of the machine (e.g., central processing unit (CPU) utilization, random access memory (RAM) utilization, etc.) and information of the session (e.g., logon duration, session responsiveness, session resiliency, etc.) relating to the user experience (UX) during access of the session.

Despite having good ranges of certain factors contributing to the performance of the session (e.g., logon duration, sufficient resource capacity, session resiliency, etc.), the UX may be degraded due to slow, sluggish, or unresponsive machine hosting the session launched by the client device. For instance, machine responsiveness can impact the responsiveness of one or more sessions hosted on the machine. In these situations, the admins may not have visibility on the causes of the poor UX or steps to troubleshoot individual sessions. Further, the admins may resort to restarting the machine which will impact users with active sessions on the machine, thereby increasing downtime, reducing uptime, and degrading the UX of other users. With numerous session failures, analyzing the failures without logical grouping or prioritization may be inefficient, time-consuming, inaccurate, reduce uptime, and result in poor availability of VAD deployments.

Therefore, the device can correlate the session performance (e.g., UX score) to the hardware performance of the machine to consider taking an action for the session, thereby reducing time to resolution for session failures and improving UX of the sessions. The device can identify overloaded machines due to an excessive number of sessions or resource consumption by the active sessions. Responsively, the device can alert the admins of the machines and recommend actions to take, such as restarting the machine, switching to maintenance mode, logging off one or more sessions, migrating sessions between machines, among others. The device can prioritize the most overloaded machines or sessions with the poorest UX.

The device may automatically trigger an action responsive to overloaded machines or poor UX of sessions. The device may alert the admins subsequent to initiating the action. Thus, systems and methods of this technical solution can correlate UX score with machine performance (e.g., availability and responsiveness) to promote uptime, reduce downtime of session or machine, improve UX for individual sessions without impacting other active sessions, reduce the traffic of incoming tickets or from manually taking actions, and improve efficiency in addressing session failures.

In an aspect, this disclosure is directed to a method for alerting admins about overloaded machines. The method can include receiving, by a device, for a plurality of time intervals, a metric of performance of hardware of a machine hosting a plurality of sessions between a plurality of clients. The method can include identifying, by the device, for the plurality of time intervals, a plurality of scores indicative of performance of the corresponding plurality of sessions. The method can include triggering, by the device, an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals.

Each of the predetermined number of time intervals may be consecutive to one another. The method can include triggering, by the device, the action responsive to a correlation between the metric of performance of hardware and the plurality of scores. The metric of performance of hardware may be based on at least one of an aggregated CPU consumption, an aggregated memory consumption, a predetermined number of resource spikes for the plurality of time intervals, or a number of available sessions of the machine. The method can include switching, by the device responsive to triggering the action, the machine to a maintenance mode in which the machine rejects subsequent requests to establish sessions on the machine.

The method can include restricting, by the device responsive to the triggering of the action, resources for one or more processes executing on the at least one of the plurality of sessions on the machine. The method can include terminating, by the device, the one or more processes executing on the at least one of the plurality of sessions on the machine. The method can include transferring, by the device responsive to the triggering the action, one or more of the plurality of sessions to a second machine hosting a second plurality of sessions.

The method can include rebooting, by the device responsive to the triggering the action, the at least one of the plurality of sessions or the machine hosting the plurality of sessions. The method can include determining, by the device for a second predetermined number of time intervals that are subsequent to the predetermined number of time intervals and subsequent to executing the action, that i) the metric of performance of hardware fails the first threshold for a second predetermined number of time intervals of a second plurality of time intervals, and ii) the at least one of the plurality of scores fails the second threshold for the same second predetermined number of time intervals subsequent to triggering the action. The method can include triggering, by the device, responsive to the determination, a second action to perform on the machine or one or more of the plurality of sessions, the second action different from the action.

Triggering the action may be responsive to the at least one of the plurality of sessions being the same session corresponding to the at least one of the plurality of scores failing the second threshold for the same predetermined number of time intervals. The plurality of scores can correspond to a user experience score that is based on at least one of a resource utilization of a respective session, a responsiveness of the session, a logon duration of the session, or a number of failures of the session.

In another aspect, this disclosure is directed to a system for alerting admins about overloaded machines. The system can include a device comprising one or more processors, coupled to memory. The device can receive, for a plurality of time intervals, a metric of performance of hardware of a machine hosting a plurality of sessions between a plurality of clients. The device can identify, for the plurality of time intervals, a plurality of scores indicative of performance of the corresponding plurality of sessions. The device can trigger an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals.

Each of the predetermined number of time intervals are consecutive to one another. The device can trigger the action responsive to a correlation between the metric of performance of hardware and the plurality of scores. The metric of performance of hardware may be based on at least one of an aggregated CPU consumption, an aggregated memory consumption, a predetermined number of resource spikes for the plurality of time intervals, or a number of available sessions of the machine. The device can switch, responsive to triggering the action, the machine to a maintenance mode in which the machine rejects subsequent requests to establish sessions on the machine.

The device can restrict, responsive to the triggering of the action, resources for one or more processes executing on the at least one of the plurality of sessions on the machine. The device can restrict, responsive to the triggering of the action, the one or more processes executing on the at least one of the plurality of sessions on the machine. The device can transfer, responsive to the triggering the action, one or more of the plurality of sessions to a second machine hosting a second plurality of sessions. The device can reboot, responsive to the triggering the action, the at least one of the plurality of sessions or the machine hosting the plurality of sessions.

The device can determine, for a second predetermined number of time intervals that are subsequent to the predetermined number of time intervals and subsequent to executing the action, that i) the metric of performance of hardware fails the first threshold for a second predetermined number of time intervals of a second plurality of time intervals, and ii) the at least one of the plurality of scores fails the second threshold for the same second predetermined number of time intervals subsequent to triggering the action. The device can trigger, responsive to the determination, a second action to perform on the machine or one or more of the plurality of sessions, the second action different from the action.

These and other aspects and implementations are discussed in detail below. The foregoing information and the following detailed description include illustrative examples of various aspects and implementations, and provide an overview or framework for understanding the nature and character of the claimed aspects and implementations. This Summary is not intended to identify key features or essential features, nor is it intended to limit the scope of the claims included herewith. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
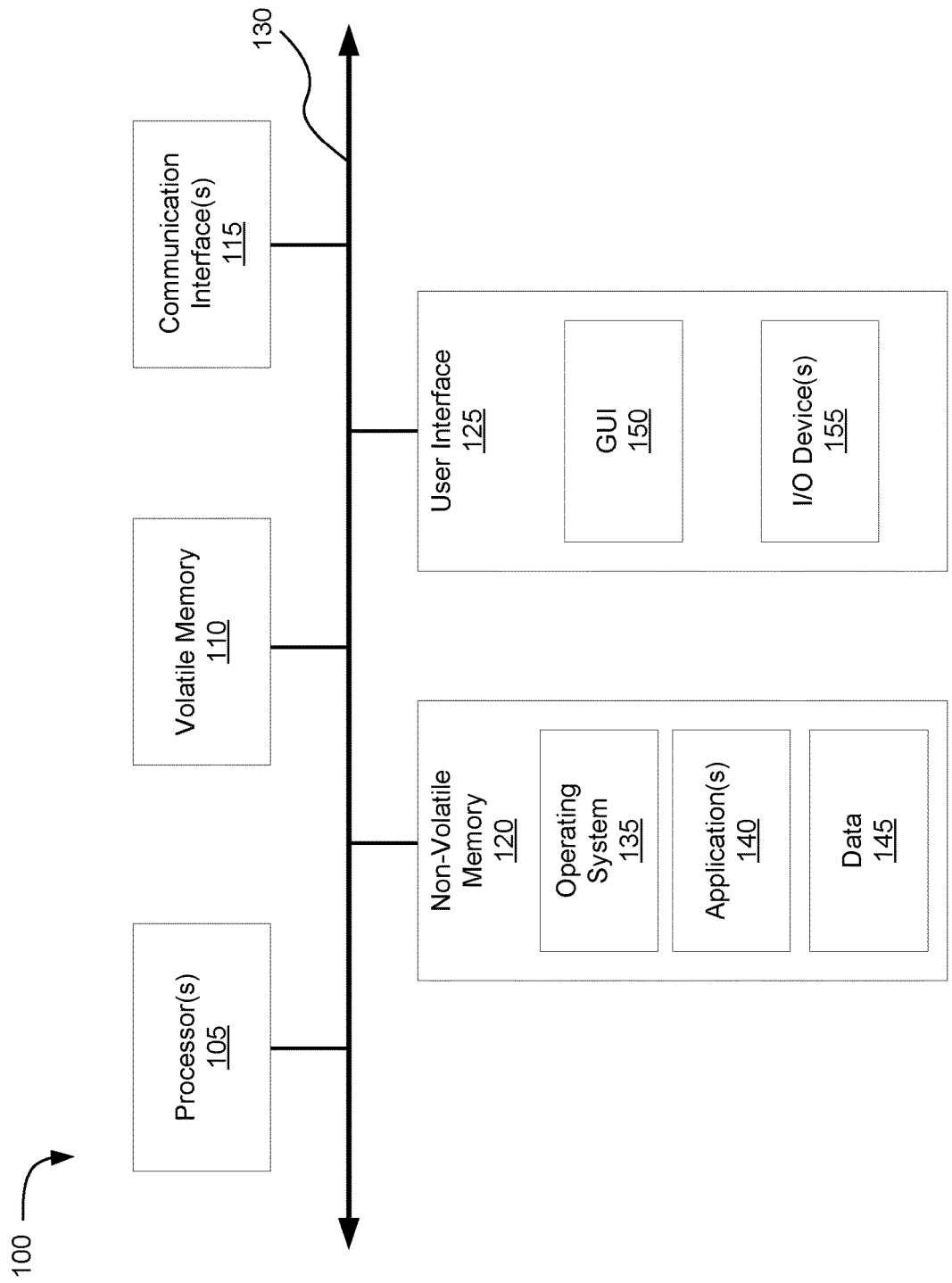
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for managing overloaded machines.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
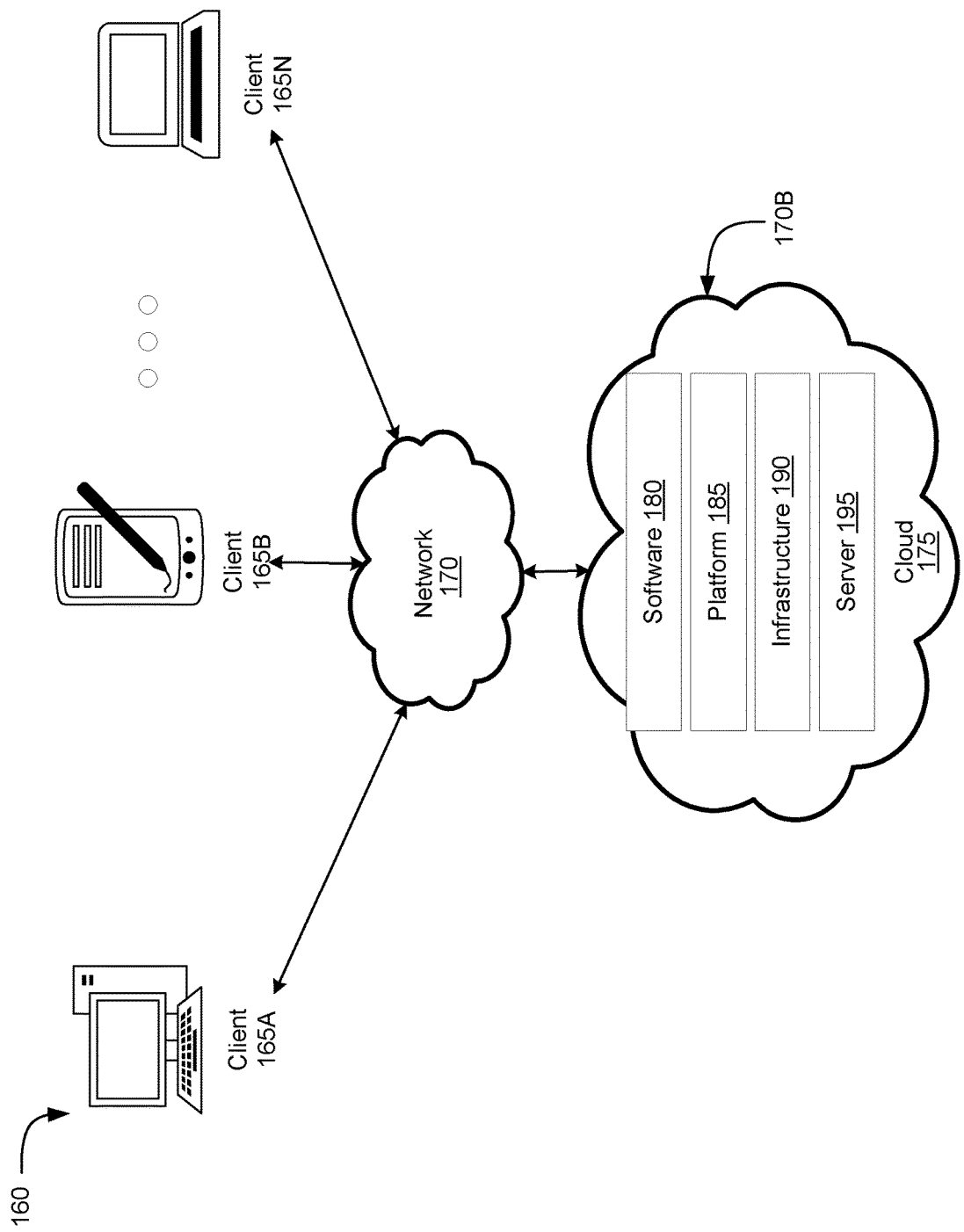
FIG. 1B is a block diagram depicting a computing environment comprising client device in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
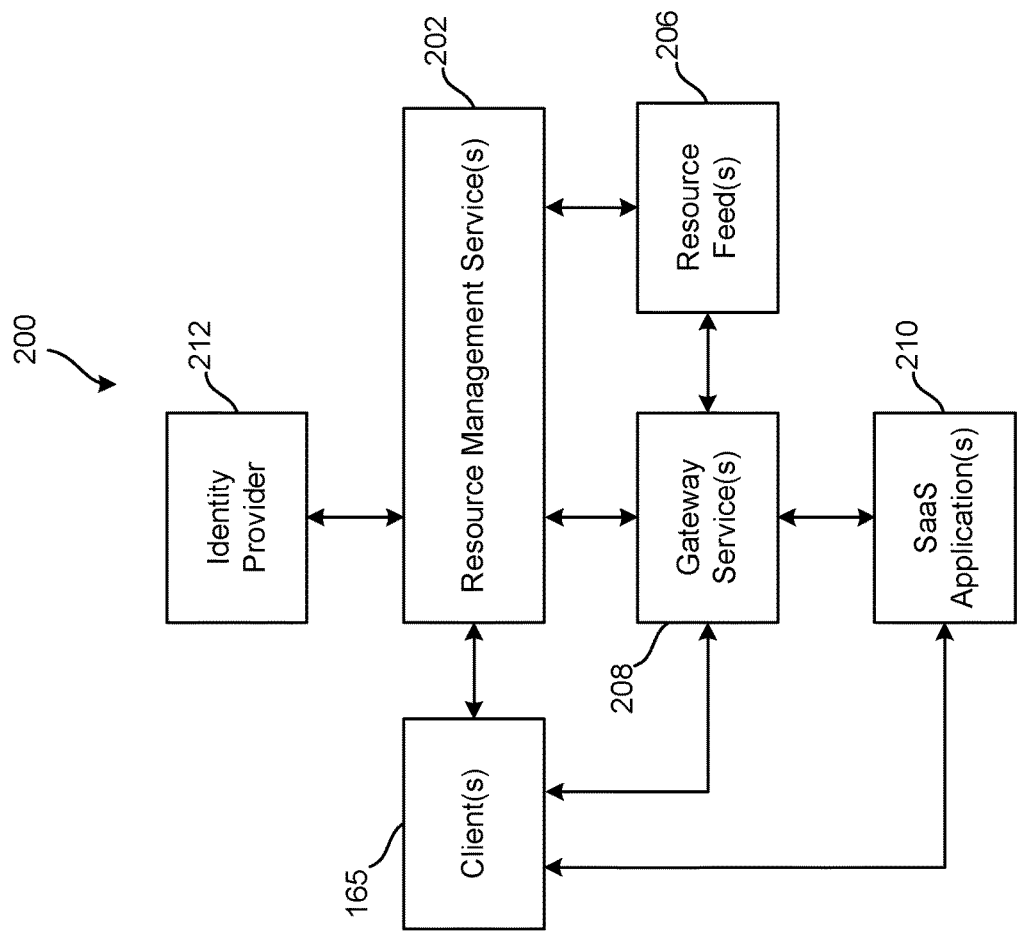
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
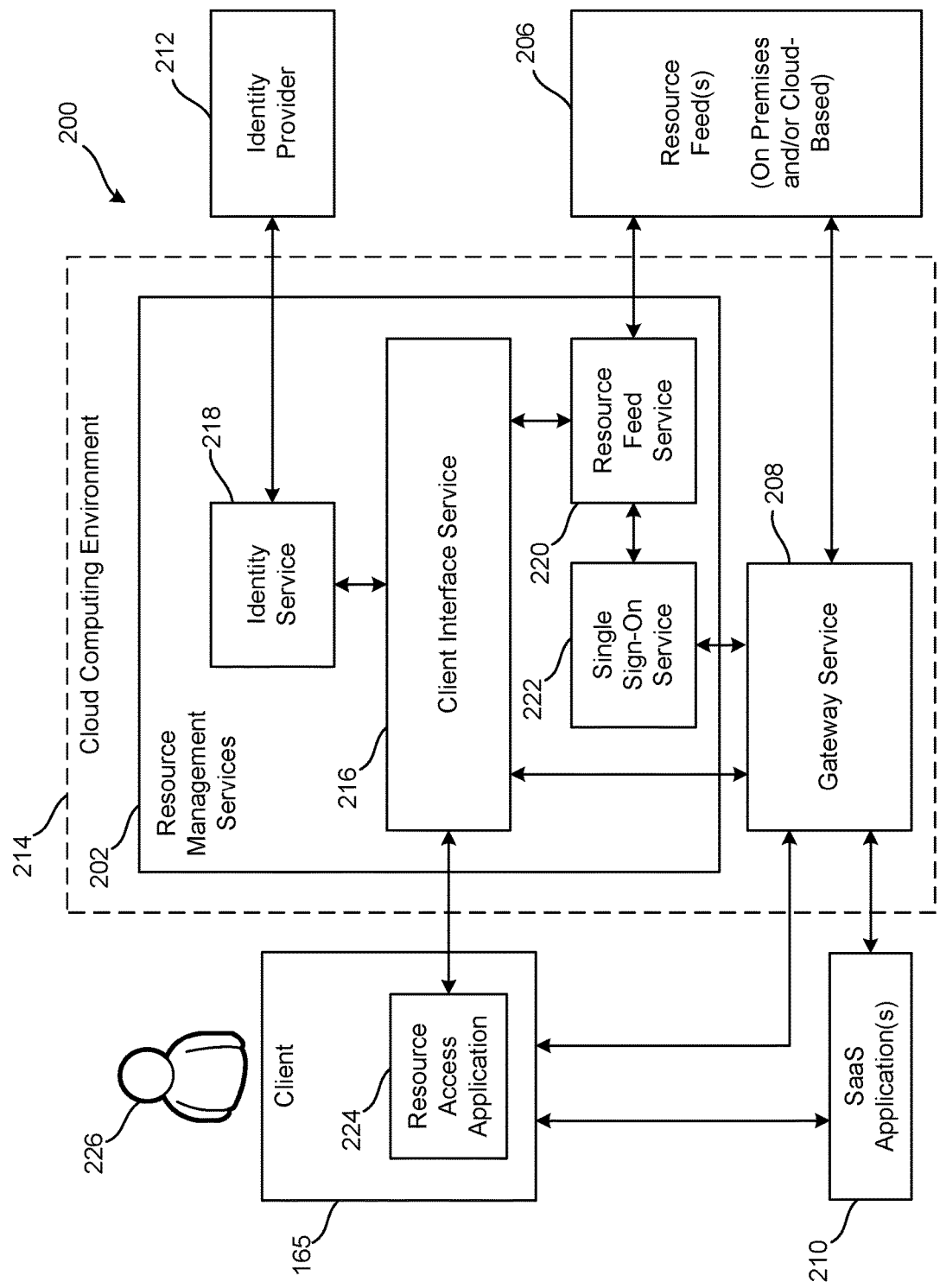
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of the illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well as a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (4) restricting navigation, e.g., by disabling the next and/or back browser buttons, (5) restricting downloads, e.g., by disabling the ability to download from within the SaaS application, and (6) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface-without needing to switch context from one resource to another. Further, event notifications in a resource activity feed may be accompanied by a discrete set of user-interface elements, e.g., "approve,"

"deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
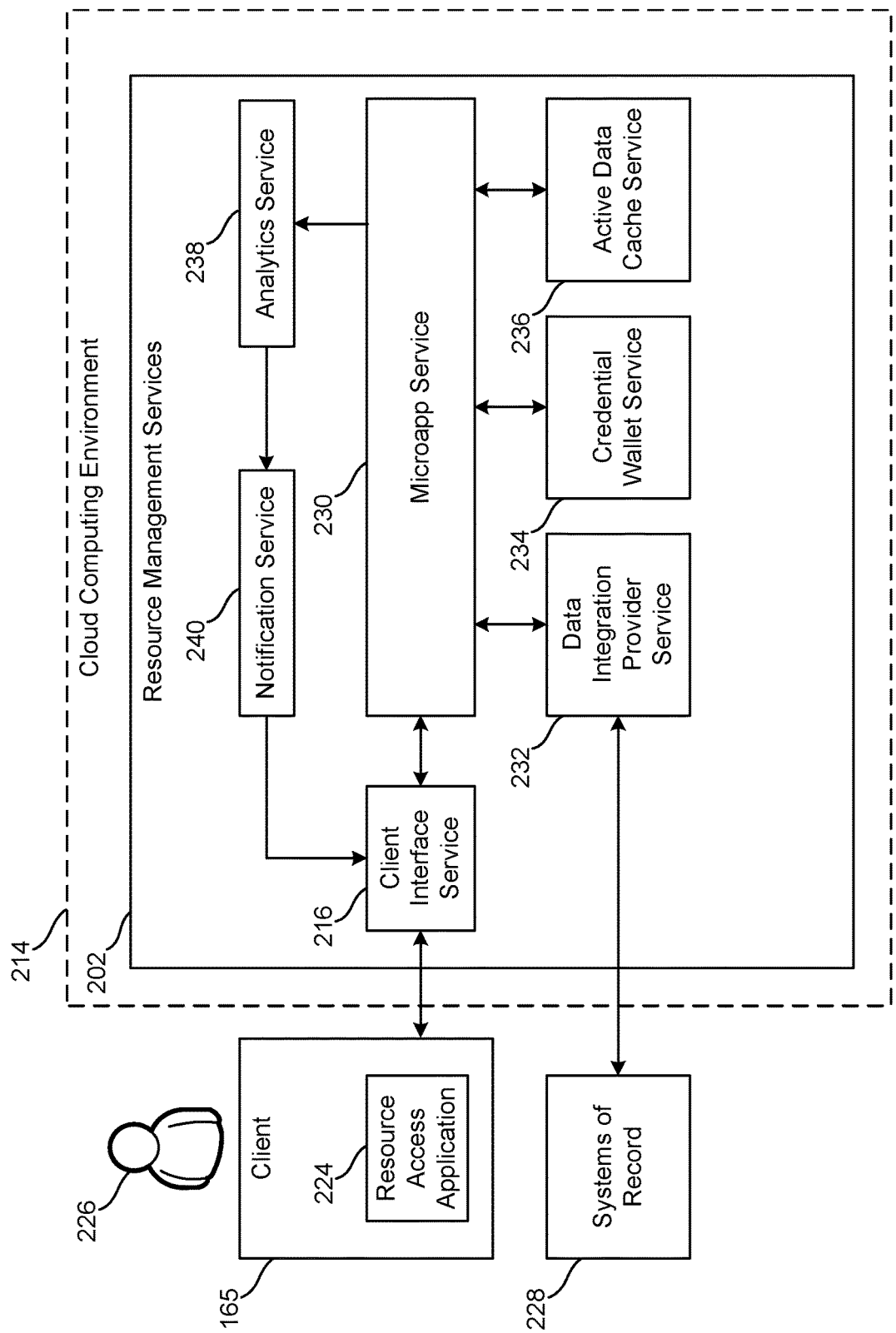
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back end. In some embodiments, users may be able to interact with the virtual assistance through either the resource access application 224 or directly from another resource, such as Microsoft Teams. This feature may allow employees to work efficiently, stay organized, and delivered the specific information they are looking for.

C. Systems and Methods for Managing Overloaded Machines

A machine remote from client devices can host one or more sessions for enabling access to resources. The machine may be overloaded due to excessive resource utilizations. The performance of individual sessions hosted on the machine may be impacted due to overloading, which leads to degradation in UX. In particular, the administrators may not have visibility as to the cause of UX degradation. Hence, it can be challenging to detect an impact on the UX sessions caused by hardware performance degradation or limitations of the machine. The administrator may resort to restarting the machine, which further impacts other active sessions.

The systems and methods of the present disclosure can prioritize machines, alert administrators, and perform an action on one or more machines (or sessions) with poor UX. By prioritizing and performing the action, the systems and methods can improve the UX across sessions on an environment (e.g., the virtual application and desktop environment). The systems and methods can include a device to analyze poor UX sessions and session failures to recommend machines and actions to take without intervention by the admins. For instance, the device can analyze or correlate one or more machines that cause continuous session degradation and failures, such as session degradation over a period of time. Subsequently, the device can provide a heuristic to the administrator including a list of one or more machines and actions recommended for the machines.

To determine one or more machines or sessions to take action on, the device may perform root cause analysis. For example, the device can identify individual machines with high resource utilization. The device can identify or determine individual sessions with poor performance, which reflects poor UX. The device can correlate or compare the high resource consumption machines to the associated sessions with poor performance. Based on the two metrics (e.g., performance metrics of the machines and sessions) failing their respectively associated thresholds, the device can proceed to alert the admin, suggest at least one action, or perform an action on the machines or sessions.

In some cases, to perform the action, an admin may provide an input to the device, such as interaction with the generated alert. The alert may include a graphical user interface (GUI) indicating at least one machine impacting UX and one or more actions recommended for the machine. The action may include basic (e.g., an action) or composite (sequence of actions) actions. In some cases, the device can automatically initiate or perform an action on the machine or session, such as based on policies, inputs, or preferences pre-determined or provided by the admin. The one or more actions may include at least i) terminating at least one process of a session consuming the most CPU or RAM, ii) capping or limiting resource consumption by at least one process, iii) logging off at least one session, iv) switch the machine to maintenance mode to avoid creation or assignment of new sessions in the machine, or v) restarting the machine.

Figure 3:
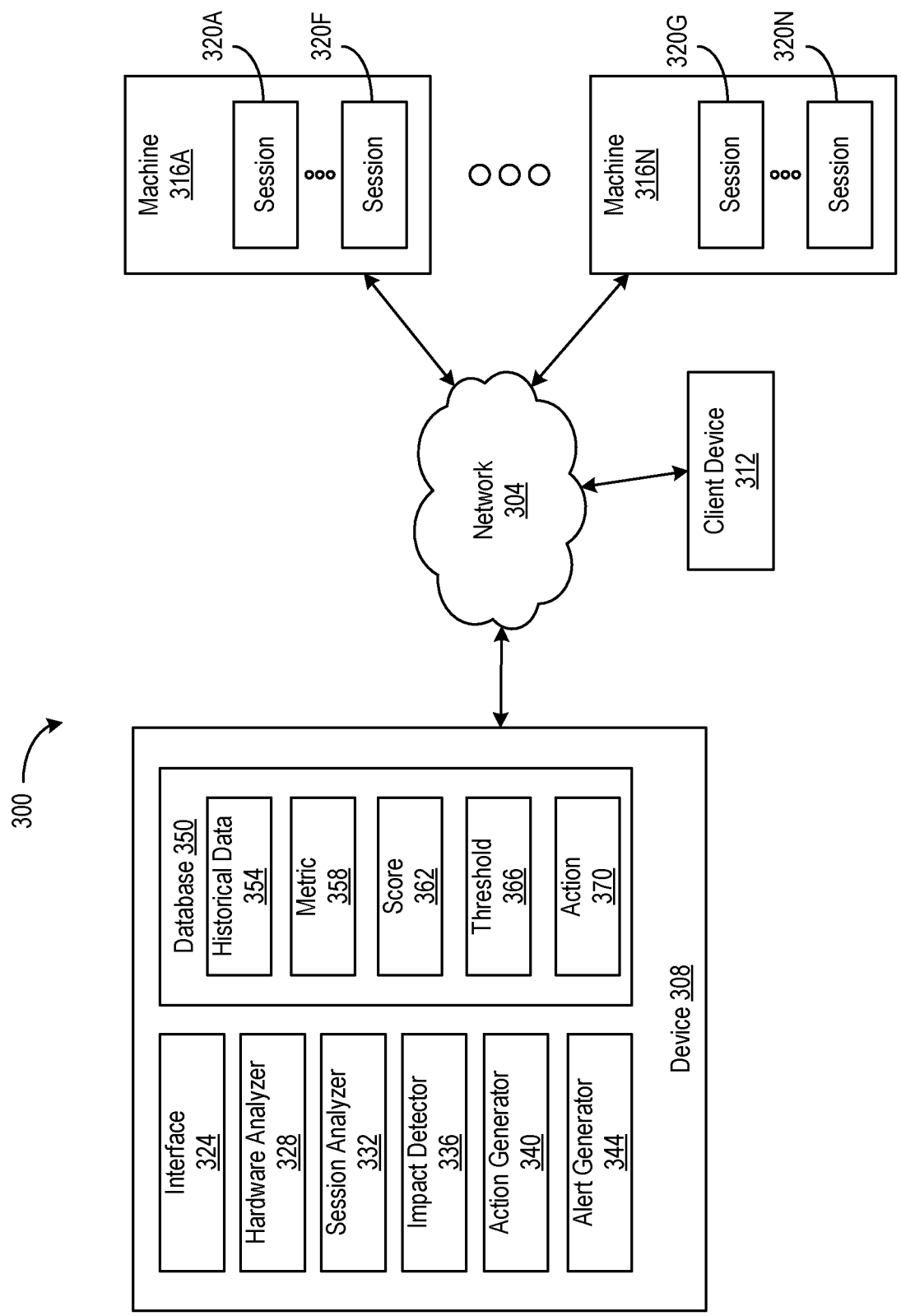
FIG. 3 is a block diagram of an example system for managing overloaded machines, in accordance with one or more implementations.

Referring to FIG. 3, depicted is a block diagram of one embodiment of a system 300 for alerting admins about overloaded machines. The system 300 can include at least one network 304, at least one device 308, at least one client device 312, and one or more machines 316A-N (sometimes generally referred to as machine(s) 316 or server(s)). The components (e.g., network 304, device 308, client device 312, or machine 316) of the system 300 can include or be composed of hardware, software, or a combination of hardware and software components. The one or more components (e.g., device 308, client device 312, or machine 316) of the system 300 can establish communication channels or transfer data via the network 304. For example, the client device 312 can communicate with at least one of the device 308 or the machine 316 via the network 304. In another example, the device 308 can communicate with other devices, such as the client device 312 or the machine 316 via the network 304. The communication channel between various different network devices can communicate with each other via the network 304 or different networks 304.

The network 304 can include computer networks such as the Internet, local, wide, metro or other area networks, intranets, satellite networks, other computer networks such as voice or data mobile phone communication networks, and combinations thereof. The network 304 may be any form of computer network that can relay information between the one or more components of the system 300. The network 304 can relay information between client devices 312 and one or more information sources, such as web servers or external databases, amongst others. In some implementations, the network 304 may include the Internet and/or other types of data networks, such as a local area network (LAN), a wide area network (WAN), a cellular network, a satellite network, or other types of data networks. The network 304 may also include any number of computing devices (e.g., computers, servers, routers, network switches, etc.) that are configured to receive and/or transmit data within the network 304. The network 304 may further include any number of hardwired and/or wireless connections. Any or all of the computing devices described herein (e.g., client device 312, device 308, machines 316, etc.) may communicate wirelessly (e.g., via WiFi, cellular, radio, etc.) with a transceiver that is hardwired (e.g., via a fiber optic cable, a CAT5 cable, etc.) to other computing devices in the network 304. Any or all of the computing devices described herein (e.g., client device 312, device 308, machines 316, etc.) may also communicate wirelessly with the computing devices of the network 304 via a proxy device (e.g., a router, network switch, or gateway). In some implementations, the network 304 can be similar to or can include the network 170 or a computer network accessible to the computer 100 described herein above in conjunction with FIG. 1A or 1B.

The system 300 can include or interface with at least one client device 312 (or various client devices 312). Client device 312 can include at least one processor and a memory, e.g., a processing circuit. The client device 312 can include various hardware or software components, or a combination of both hardware and software components. The client devices 312 can be constructed with hardware or software components and can include features and functionalities similar to the client devices 165 described hereinabove in conjunction with FIGS. 1A-B. For example, the client devices 165 can include, but is not limited to, a television device, a mobile device, smart phone, personal computer, a laptop, a gaming device, a kiosk, or any other type of computing device.

The client device 312 can include at least one interface for establishing a connection to the network 304. The client device 312 can communicate with other components of the system 300 via the network 304, such as the device 308 or the machines 316. For example, the client device 312 can communicate data packets with one or more machines 316 via the network 304. The client device 312 can communicate with the device 308 via the network 304. The client device 312 can transmit data packets to the device 308 configured to select and forward the data packets from the client device 312 to at least one machine 316. In some cases, the client device 312 can communicate with other client devices 312.

The client device 312 can include, store, execute, or maintain various application programming interfaces ("APIs") in the memory (e.g., local to the client device 312). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol described hereinabove in conjunction with clients 165 of FIG. 1B. The client device 312 can use at least one of various protocols for transmitting data to the machine 316. The protocol can include at least a transmission control protocol ("TCP"), a user datagram protocol ("UDP"), or an internet control message protocol ("ICMP"). The data can include a message, a content, a request, or otherwise information to be transmitted from the client device 312 to a machine 316. The client device 312 can establish a communication channel or a communication session with a machine 316 and transmit data to the machine 316. The client device 312 can establish a communication session or channel with the machine 316 via the network 304 or other intermediary devices. In some cases, the client device 312 can transmit data to the machine 316 to be forwarded or relayed to the device 308. In some other cases, the client device 312 can transmit data directly to the device 308. In some cases, data from the client device 312 to the machine 316 can be intercepted by the device 308.

The client device 312 can be assigned to a machine 316 (e.g., at least one physical or virtual machine). For instance, the client device 312 can establish a session 320 with a machine 316 hosting various sessions 320. The session can be a virtual machine session executing or hosted on the machine 316 (e.g., physical machine or server). Individual machines 316 can host one or more sessions 320A-N (sometimes generally referred to as session(s) 320) for different client devices 312 or users. In some cases, the machine 316 can be a multi-session machine, hosting multiple sessions for respective users. In some other cases, the machine can be a single session machine, hosting a session 320 for individual client devices 312 or users. The client device 312 can access other types of machines 316. For example, the client device 312 can provide or transmit credentials input by the user to launch a session or access a cloud service. Upon successful launch of the session 320, the client device 312 can access resources from the machine 316, such as resources hosted by the machine 316 or resources communicated between the machine 316 and other sources. The other sources can include cloud services, remote devices, data repositories, among others.

The system 300 can include or interface with one or more machines 316. The machine 316 may be referred to as a host system, a server, a cloud device, a remote device, a remote entity, or a physical machine. One or more of the machines 316 can include, be, or be referred to as a node, remote devices, remote entities, application servers, or backend server endpoints. The machine 316 can be composed of hardware or software components, or a combination of both hardware or software components. The machine 316 can include resources for executing one or more applications, such as SaaS applications, network applications, or other applications within a list of available resources maintained by the machine 316. The machine 316 can include one or more features or functionalities of at least resource management services (e.g., resource management services 202) or other components within the cloud computing environment (e.g., cloud computing environment 214), such as in conjunction with FIGS. 2A-C. The machine 316 can communicate with the client device 312 via a communication channel established by the network 304, for example.

The machine 316 can communicate data packets or traffic with at least the client device 312. The machine 316 can serve or handle traffic from client devices 312. The machine 316 can be associated with a hash in a list of machines 316. In some cases, the machine 316 can receive traffic from the device 308. In some cases, the machine 316 can receive data from the client device 312 via the device 308. For instance, the device 308 can receive traffic or intercept traffic from the client device 312, and the machine 316 can receive the traffic from the device 308.

The machine 316 can host one or more virtual machines. For instance, the machine 316 can be a physical machine hosting various virtual machines. The machine 316 can include features or functionalities similar to a cloud computing environment 214 to provide resources for applications or services accessed by the client device 312. Individual virtual machines can be associated with a session 320. The machine 316 can provide the client device 312 with resources via an established session 320. In some cases, the machine 316 can include or maintain a log of historical hardware performance, such as CPU utilization, RAM utilization, network bandwidth, read or write speed, etc. The machine 316 may be managed by an administrator. The machine 316 may provide historical data (e.g., hardware performance data, etc.) to other entities or devices, such as the device 308. In some cases, the machine 316 can include one or more features, functionalities, components, or perform one or more operations of the device 308. The machine 316 may be remote from the device 308. In some cases, the machine 316 can include the device 308 as part of the machine 316.

The machine 316 can allocate a portion of the hardware resources (e.g., CPU resource, RAM resource, etc.) to individual sessions 320. The machine 316 may generate new sessions 320 or virtual machines in response to incoming traffic from new users. In some cases, the machine 316 may be overloaded by excessive resource consumption, such as due to the number of active sessions. Due to the overloading of the machine 316, the response time may decrease (e.g., latency increase), thereby affecting the performance of the individual sessions 320 hosted on the respective machine 316. Degradation in the performance of the machine 316 or sessions 320 can impact the user experience (UX) of the user engaging in the session 320.

The system 300 can include at least one device 308. The device 308 can include various components to determine the performance of machines 316 or session performance hosted on the respective machine 316. The device 308 can include at least one interface 324, at least one hardware analyzer 328, at least one session analyzer 332, at least one impact detector 336, at least one action generator 340, at least one alert generator 344, and at least one database 350. The database 350 can include at least one historical data storage 354, at least one metric storage 358, at least one score storage 362, at least one threshold storage 366, at least one action storage 370. Individual components (e.g., interface 324, hardware analyzer 328, session analyzer 332, impact detector 336, action generator 340, alert generator 344, or database 350) of the device 308 can be composed of hardware, software, or a combination of hardware and software components. Individual components of the device 308 can be in electrical communication with each other. For instance, the interface 324 can exchange data or communicate with the hardware analyzer 328, session analyzer 332, impact detector 336, action generator 340, or alert generator 344. The one or more components of the device 308 can be used to perform features or functionalities, such as identifying the hardware performance of the one or more machines 316, identifying the performance of individual sessions 320 (or virtual machines) hosted on the respective machine 316, identifying the UX score (e.g., user experience score) for individual sessions 320, correlating impact of the UX to the degradation of the hardware performance, generating at least one action, or generating at least one alert. The device 308 can operate remotely from the machine 316 or other devices in the system 300. In some cases, the device 308 can be a part of one or more machines 316, such as an integrated device, embedded device, a server-operated device, or a device accessible by the administrator of one or more machines 316 hosting one or more sessions 320. For example, the device 308 can perform operations local or on-premise to the machine 316.

The interface 324 can interface with the network 304, devices within the system 300 (e.g., client devices 312 or machines 316), or components of the device 308. The interface 324 can include features and functionalities similar to the communication interface 115 to interface with the aforementioned components, such as in conjunction with FIG. 1A. For example, the interface 324 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 324 can include at least a built-in network adapter, network interface card, PCMCIA network card, EXPRESSCARD network card, card bus network adapter, wireless network adapter, USB network adapter, modem, or any other device suitable for interfacing one or more devices within the system 300 to any type of network capable of communication. The interface 324 can communicate with one or more aforementioned components to receive data from at least one of the client devices 312 or the machines 316 (e.g., live data or historical data), such as data associated with the performance of the machine 316, the performance of the session 320 of the machine 316, or traffic received by the sessions 320.

The hardware analyzer 328 can identify, obtain, or receive hardware information (e.g., hardware performance) of a machine 316 hosting one or more sessions 320 between one or more client devices 312. For example, the hardware analyzer 328 can identify or receive at least resource utilization or consumption (e.g., CPU utilization, RAM utilization, etc.), latency information, response time, process failures, timer interrupt delays, resource capacity, number of sessions (e.g., available or active sessions), number of resource spikes, duration of resource spikes, etc. The hardware analyzer 328 can generate a metric or score associated with the hardware performance of the machine 316 based on the hardware information. The metric can be a value or a grade indicating the performance of the machine 316, such as ranging from 0-100, A-F, etc. The hardware analyzer 328 can aggregate multiple hardware information to determine the score, such as a score based on a combination of response time and resource capacity or resource utilization and latency information. In some cases, the hardware analyzer 328 can determine the metric for the performance of the hardware of the machine 316 based on at least the resource utilization. For instance, the hardware analyzer 328 can determine a score corresponding to the percentage of at least one of CPU utilization or RAM utilization. In some cases, the hardware analyzer 328 can aggregate a combination of resource utilization to generate the metric, such as CPU utilization and RAM utilization, read speed and write speed, or network bandwidth and latency information, among other factors.

The hardware analyzer 328 can determine upper bound values for processing loads for various machines 316 in the computing environment to monitor the processing load on the respective machines 316. In some cases, the hardware analyzer 328 may further analyze the machine 316, for example, if the upper bound value of a machine 316 exceeds a threshold. The threshold can refer to a machine threshold, hardware threshold, or a first threshold. For instance, the hardware analyzer 328 can receive an indication that the upper bound value for a machine 316 exceeds the threshold. The thresholds may be predetermined by an administrator (admin) or dynamically adjusted, such as based on time of day, day of the week or month, hardware configuration (e.g., hardware resource capacity), or types of users assigned to the machine 316. In response to receiving the indication that the upper bound value exceeds the threshold, the hardware analyzer 328 can identify one or more sessions 320 which causes the upper bound value of the machine 316 to exceed the threshold. In some cases, the hardware analyzer 328 can indicate one or more sessions 320 for the session analyzer 332 to analyze. In some cases, the session analyzer 332 can analyze session performance of any machine 316 without the indication or concurrent to analyzing the hardware of the machine 316.

In some cases, the hardware analyzer 328 can monitor one or more sessions 320 on a machine 316 by using an upper bound value to monitor a processing load of the machine 316. The hardware analyzer 328 can assess sessions 320 and resources on the machine 316 responsive to a comparison of the upper bound value to the processing load of the machine 316. The hardware analyzer 328 can use the upper bound value to flag one or more machines 316 due to degradation of performance, which may impact the session performance or UX of users.

The hardware analyzer 328 can determine or generate upper bound values. The upper bound values can include or correspond to a metric determined based on a processing load of a machine 316 to monitor or assess the processing load level (e.g., CPU utilization, RAM utilization, read/write speed, network bandwidth, etc.). The upper bound value can include or correspond to a percentage or portion of the processing load. The upper bound value can be configured to bound, summarize, or include a percentage or portion of the processing load at a time point or time interval for a range of time or rolling window. The hardware analyzer 328 can determine or compute an upper bound value to summarize a previous level, current level, or ongoing level of the processing load of a machine 316 to make informed decisions regarding the flag or alert for the administrator in correlation with the UX of individual sessions 320 hosted on the machine 316. The upper bound value can include an ongoing upper bound or rolling upper bound of the processing load to account for seasonality or different sources of variability in a time series of data points corresponding to load values for the processing load during a range of time.

According to the information from the machine 316, the hardware analyzer 328 can generate, identify, or receive a metric indicative of the performance of the respective machine 316. The metric may be referred to as a hardware metric or machine performance metric. The metric can be stored in the database 350 (e.g., metric storage 358). In some cases, the hardware analyzer 328 can receive or obtain the metric pre-generated and stored in the database 350. In some cases, the hardware analyzer 328 can receive the metric generated by the machine 316 based on the hardware information.

In some cases, the hardware analyzer 328 can flag one or more machines 316 failing a hardware threshold. For instance, if the threshold is set to 80% resource utilization (e.g., CPU or RAM utilization), the hardware analyzer 328 may flag machines 316 with resource utilization greater than the threshold. Flagging the machines 316 can include providing a list or indication of one or more machines 316 to the impact detector 336 for correlation with at least one UX score of the hosting session 320. In another example, the threshold can be a performance score ranging from 0 (e.g., poor performance) and 100 (e.g., great performance). If the threshold is set to 30/100, the hardware analyzer 328 can flag machines 316 having a score below (or equal to) 30, for example.

In some cases, the hardware analyzer 328 may flag the machine 316 having prolonged hardware performance below the threshold or utilization above the threshold. For instance, the hardware analyzer 328 can identify the hardware performance of the machine 316 for time intervals (e.g., 5 minutes, 30 minutes, 1 hour, 3 hours, etc.). Based on the configuration or policy of the administrator, the hardware analyzer 328 may flag machines 316 with performance degradation for multiple time intervals. The multiple time intervals may be consecutive or non-consecutive. For example, the hardware analyzer 328 can flag machines 316 with hardware performance failing the threshold for at least 5 consecutive time intervals. In another example, the hardware analyzer 328 can flag machines 316 failing the threshold for 4 out of 10 time intervals.

The session analyzer 332 can identify, obtain, or determine the performance of one or more sessions 320 hosted on individual machines 316. One or more operations of the session analyzer 332 can be performed concurrent or parallel to one or more operations of at least the hardware analyzer 328. In some cases, the one or more operations of the session analyzer 332 can be performed subsequent or prior to one or more operations of at least the hardware analyzer 328. The session analyzer 332 can determine the performance of the session 320 including at least one of interaction score, session score, or UX score. In some cases, the session analyzer 332 can determine the performance of the session 320 based on at least the interaction score, session score, or UX score. One or more of the various scores (e.g., interaction score, session score, or UX score) can be indicative of the performance of the corresponding sessions.

For example, the session analyzer 332 can determine an interaction score. The interaction score may be referred to as, correspond to, or be a part of an application score for the session 320 or one or more applications (e.g., virtual application or SaaS application) accessed by the user. The session analyzer 332 can obtain event data of the session 320, such as application launch time, application launch failure, latency data, among other logged events for the application executing on the session 320. The session analyzer 332 can determine failure rates, error rates, fault rates, latency duration, latency frequency, or interruption information of the session 320. The session analyzer 332 use at least one of the aforementioned information of the session 320 to determine a score for the session 320 (e.g., interaction score reflecting the performance of the session 320).

In some cases, the interaction score may be different from the session score. For example, the session analyzer 332 can determine the interaction score reflecting the application performance. The session analyzer 332 can use at least one or combinations of application information to generate the interaction score. The session analyzer 332 can determine the session score based on the performance of the session, such as latency, resource utilization (e.g., CPU, RAM, read/write speed, network bandwidth, etc.), logon duration, lag, jittery, session responsiveness, session resiliency, etc. The session analyzer 332 can associate or correlate at least one of the application performance or the session performance with the UX score (e.g., correlating the session score or interaction score to the UX score). For example, the session analyzer 332 may determine that improvement to the performance of the session 320 or application can improve the UX. In another example, the session analyzer 332 can identify that degradation to the session or application performance can degrade the UX.

In further example, the session analyzer 332 can integrate the interaction score with the session score to output a combined score. The combined score can combine a session score with the interaction score. The session analyzer 332 can store the interaction score, the session score, or the combined score in the database 350 (e.g., score storage 362). In some cases, the interaction score may refer to a score indicative of the performance of the application utilized within a session 320. For example, the session analyzer 332 can add the interaction score with a weight to determine a new session experience score (e.g., session score). For example, the session analyzer 332 can determine a new session experience score based on the interaction score of the session 320. The new session experience score (or combined score) will be impacted by the interaction score.

The session analyzer 332 can generate a UX score based on data of the session 320 or application utilized in the session 320. The session data can include an aggregated interaction score associated with one or more applications in the session 320. The data processing system can determine a session score (sometimes referred to as session experience score) based on information associated with the session 320, such as at least logon duration, session responsiveness, session resiliency, resource utilization, application launch duration, application or process failures, etc. The session responsiveness can be based on at least the number of failures, logon duration, number of reconnects, etc. The session analyzer 332 can combine the interaction score indicative of interactions with processes or applications on the session 320 with the session score to determine an overall UX score.

The session analyzer 332 can generate a UX score ranging from 0 to 100. Based on at least one of or the combination of the interaction score and the session score, the session analyzer 332 can determine the UX score. In some cases, the session analyzer 332 can compare the session performance or application performance to the historical performance of other sessions 320 of the one or more machines 316. For example, the session analyzer 332 can compare session responsiveness, resource consumption, remaining resource capacity, among other session event data (or application event data) to other sessions 320 to determine the UX score. In some cases, the UX score can correspond to a metric (e.g., a second metric different from the metric of hardware performance).

The session analyzer 332 can flag at least one session 320 of one or more machines 316 with poor UX. The session analyzer 332 can flag the session 320 for comparison or correlation with the hardware performance of the respective machine 316. For instance, the session analyzer 332 can flag one or more sessions 320 that the impact detector 336 should correlate with the host device or the respective machine 316.

The session analyzer 332 can determine that the UX is poor based on a comparison with a threshold. The threshold may be referred to as a UX score threshold, session threshold, or a second threshold. For example, if the threshold is 40 (e.g., 40 out of 100), the session analyzer 332 may flag sessions 320 associated with a UX score of 40 or less to the impact detector 336. In some cases, flagging the sessions 320 can include listing sessions 320 with poor UX scores. The UX score threshold can be predetermined by the administrator of the device 308 or machine 316. In some cases, the session analyzer 332 can flag one or more sessions 320 subsequent to determining that the associated machine 316 does not satisfy the hardware threshold or another threshold.

In some cases, the session analyzer 332 may flag the session 320 with prolonged poor UX score (e.g., UX score below the threshold). For instance, the session analyzer 332 can identify the UX score of individual sessions 320 at any time interval (e.g., 5 minutes, 30 minutes, 1 hour, 3 hours, etc., predetermined based on admin configuration). Based on the configuration or policy of the administrator, the session analyzer 332 may flag sessions 320 with poor UX score for multiple time intervals. The multiple time intervals may be consecutive or non-consecutive. For example, the session analyzer 332 can flag sessions 320 with UX scores failing the threshold for at least 5 consecutive time intervals. In another example, the session analyzer 332 can flag sessions 320 with UX scores failing the threshold for 4 out of 10 time intervals.

The impact detector 336 can determine or detect one or more machines 316 having performance below a threshold, which causes degradation to the UX of one or more hosting sessions 320. The impact detector 336 can generate a list of machines 316 impacting one or more sessions 320 or a list of sessions 320 impacted by the respective machines 316. In some cases, the impact detector 336 can generate a list of one or more machines 316 with at least a predetermined number of sessions 320 impacted by the performance of the machine 316.

For example, the impact detector 336 can correlate the UX scores with the machine performance (e.g., hardware performance). The impact detector 336 can identify one or more machines 316 with the metric of hardware performance failing a first threshold for a predetermined number of time intervals. The metric or the first threshold can correspond to the availability of the hardware (e.g., resource capacity or resource consumption). The metric or the first threshold can correspond to other performance data of the machine 316. The impact detector 336 can obtain an indication or identification of one or more sessions failing a second threshold. The second threshold can correspond to satisfactory session performance (e.g., interaction score, session score, or UX score). Based on the one or more identified machines 316 and sessions 320, the impact detector 336 can correlate the degraded performance of machines 316 to poor UX score of sessions 320.

For instance, the impact detector 336 may correlate between time intervals when the machine 316 fails the first threshold and one or more sessions 320 fail the second threshold. The impact detector 336 may consider, flag, or otherwise mark the machines 316 and sessions 320 with corresponding (e.g., the same) time intervals when failing the first threshold and the second threshold. For example, the impact detector 336 can detect that the metric of hardware performance fails the hardware threshold in the same consecutive time intervals as the UX score failing the score threshold. In another example, the impact detector 336 can detect that the metric and the UX score have the same rate of failing the respective threshold within predetermined time intervals (e.g., 20/30, 30/50, etc.).

The impact detector 336 may consider machines 316 or sessions 320 with prolonged or continuous performance degradation. For instance, the administrator can configure the duration of the time intervals to consider the performance degradation. The administrator can configure a time interval threshold indicating the minimum number of time intervals to consider the machine 316 or session 320. The time intervals for failing the threshold can be consecutive (e.g., a number of times in a row) or for a predetermined amount during a group of cycles (time interval cycles) (e.g., for every 5 time intervals, minimum of 3 time intervals with failures). Failures may refer to unsatisfactory performance or score for flagging consideration.

In some cases, the time intervals at which the metric and the UX score fail the respective threshold may be the same or different. The administrator can configure the impact detector 336 to flag machines 316 having corresponding failures as the session 320 for a predetermined number of time intervals within a given group of cycles. For example, the metric can fail the threshold at $1^{st}$, $2^{nd}$, $3^{rd}$, and $5^{th}$ time intervals and the UX score may fail the threshold at $2^{nd}$, $3^{rd}$, $4^{th}$, and $5^{th}$ time intervals. If the ratio for flagging the machine 316 is set to 3 time intervals out of 5, the impact detector 336 can flag the machine 316 since the $2^{nd}$, $3^{rd}$, and $5^{th}$ time intervals overlap. In this case, the minimum number of failures for a given group of cycles may be three.

In another example, the minimum number of failures can be three out of five time intervals. The impact detector 336 may be configured to flag the machine 316 when at least three consecutive time periods of failures match between the machine 316 and the session 320. If the metric fails at $1^{st}$, $2^{nd}$, $3^{rd}$, and $5^{th}$ time intervals and the UX score fails at $2^{nd}$, $3^{rd}$, $4^{th}$, and $5^{th}$ time intervals, the impact detector 336 may not flag the machine, since $2^{nd}$ and $3^{rd}$ time intervals are consecutively matched. Further, and in another example, if the impact detector 336 is configured to flag with two consecutive time intervals, the impact detector 336 can flag the machine 316 based on the previous example.

In some cases, the impact detector 336 can determine hardware failures or score failures at other time intervals, such as time intervals subsequent to initiating or performing an action. The impact detector 336 can detect or correlate other impacts between the hardware of the machine 316 and the executing sessions 320. In some cases, the impact detector 336 can perform impact detection (e.g., between machine 316 and session 320) for a first group of time intervals, while the action performed by the action generator 340 can be for a second group of time intervals subsequent to the first group of time intervals.

The action generator 340 can generate, select, determine, or trigger an action to perform on the machine 316 or at least one session 320, where the machine 316 impacts the UX score of the session 320. The action generator 340 can generate or select the action in response to identifying one or more sessions 320 impacted by the performance of the machine 316, such as unresponsive, low capacity, high resource consumption, etc. In this case, the action generator 340 can generate the action responsive to a correlation between the metric and the scores. For instance, the action generator 340 can generate an action in response determining that the metric of performance of hardware fails a first threshold (e.g., hardware threshold) corresponding to the availability of the hardware for a predetermined number of time intervals, and that the score (e.g., UX score) fails a second threshold (e.g., score threshold) corresponding to satisfactory session performance for the time intervals (e.g., one or more of the same time intervals as the metric). In some cases, generating an action can refer to selecting the action or triggering the action.

Upon triggering the action, the action generator 340 can perform the action on the session 320 or machine 316. The action generator 340 can transmit instructions or command the machine 316 to take an action. In some cases, the device 308 can be embedded as part of the machine 316 to execute the action for the machine 316 or the sessions 320. The action generator 340 can select or take action based on data of the machine 316 or session 320, such as from the hardware analyzer 328 or the session analyzer 332.

The action can include at least switching the machine 316 to maintenance mode. For example, the action generator 340 can switch the machine 316 to maintenance mode to reject subsequent requests from other client devices 312 to establish sessions 320 on the machine 316. In this case, the action generator 340 can at least maintain or reduce the load on the resources of the machine 316. In some cases, the action generator 340 may switch the machine 316 to maintenance mode in response to the number of sessions 320 executing on the machine 316 greater than a session threshold or the resource consumption exceeds a resource threshold, for example.

In some cases, the action generator 340 can restrict resources for one or more processes executing on the session 320 on the machine 316. The process can include or correspond to applications or tasks executing on the session 320. For instance, the action generator 340 can restrict resources for one or more processes of the session 320 consuming the most resources. In another example, the action generator 340 can restrict resources for one or more processes for one or more sessions 320 that are not necessary for the operation of the session 320, such as certain background processes, idled processes, etc. In some cases, the action generator 340 can terminate one or more processes executing on at least one session 320 on the machine 316. For instance, the action generator 340 can terminate one or more processes consuming the most resources or processes that are idled (e.g., no interaction to the processes) for a time period (e.g., 30 minutes, 1 hour, etc.).

The action generator 340 may initiate an action to transfer one or more sessions 320 to a second machine (e.g., from machine 316A to machine 316N). The second machine can host another group of sessions 320. For instance, the first machine 316A can host sessions 320A-E and the second machine 316B can host sessions 320F-K. Transferring one or more sessions 320 to a different machine can increase the resource capacity of the machine 316 or reduce resource consumption on the machine 316. In this case, the action generator 340 can improve the responsiveness of the machine 316 or the UX score of sessions 320 that remained on the machine 316, for example. In some cases, the action generator 340 may initiate or perform an action to reboot the machine 316 or reinitialize one or more sessions 320.

In some cases, the action generator 340 may resort to rebooting the machine 316 as at least a second action, such as an action subsequent to a first action. For instance, the action generator 340 can determine that a first action (or one or more other actions) different from a rebooting action does not improve the UX score to a satisfactory level. In this case, the action generator 340 can initiate the reboot action upon determining that one or more other actions do not improve the UX score. In some cases, the action generator 340 can generate other actions supported by the machine 316 or one or more sessions 320, such as configuring certain settings for one or more sessions 320, reallocating resources, delegating traffic to remote devices, terminating certain startup processes, etc.

In some cases, the action generator 340 can recommend or suggest one or more actions to the administrator. For example, the action generator 340 can provide the action to the alert generator 344 for alerting or reporting to the administrator. The action generator 340 can receive a selection of one or more actions from the administrator. In response to the selection, the action generator 340 can perform or transmit instructions to initiate an action for the machine 316 or session 320. In some cases, the administrator can configure the action generator 340 to automatically take action. For instance, the administrator can configure the action generator 340 to trigger at least one recommended action or a combination of actions. The action generator 340 can determine which action to take based on a configuration, such as triggering maintenance mode for a high number of sessions 320, capping or terminating processes for one or more sessions 320 consuming the most resources, logging off or transferring at least one session 320 consuming the most resources, or rebooting the machine 316 when other actions do not improve UX score. In some cases, the action generator 340 can initiate a combination of actions, such as switching to maintenance mode and capping resources for one or more processes, switching to maintenance mode and logging of a user, etc. In some cases, the action generator 340 can terminate a process of a user to increase the resource capacity of the machine 316 and improve UX score for at least one other user. However, if the UX score does not improve, the action generator 340 may reboot the machine 316.

The alert generator 344 can generate an alert for the administrator. The alert generator 344 can generate a graphical user interface (GUI), notification (e.g., push notification), text, email, report, or other mediums to alert the administrator. The alert generator 344 can indicate at least one of the number of machines 316, the listing of machines 316, the number of users impacted, the number of sessions 320 associated with individual machines 316, or at least one action to take on individual machines 316. In some cases, the alert generator 344 can generate an alert that action is scheduled, is executing, or performed on one of the machines 316 or sessions 320. The alert generator 344 can provide other alerts to the administrators, such as information from the hardware analyzer 328, session analyzer 332, impact detector 336, or action generator 340.

In some cases, the alert generator 344 can alert the user of one or more actions being performed on the machine 316 or the user's session 320. For example, the alert generator 344 can alert the user that resources for one or more processes are capped, one or more processes will be terminated, the session will be logged off, or to restart the virtual machine. In another example, the alert generator 344 may inform the user of scheduled maintenance, such that the user can prepare to log off the session. In some cases, the alert generator 344 can indicate to the user that the session 320 is scheduled to be transferred to another machine 316 to handle traffic from the client device 312. The alert generator 344 can indicate a time that the action will be initiated. In some cases, the alert generator 344 can provide an option for the user to initiate one or more immediate actions, such as logging off or rebooting the session.

The database 350 may be referred to as a data repository, central storage, or memory of the device 308. The one or more storages (e.g., historical data storage 354, metric storage 358, score storage 362, threshold storage 366, or action storage 370) can be accessed, modified, interacted by one or more components (e.g., interface 324, hardware analyzer 328, session analyzer 332, impact detector 336, action generator 340, or alert generator 344) of the device 308. In some cases, the one or more storages of the database 350 can be accessed by one or more other authorized devices of the system 300. The database 350 can include other storages to store additional data from one or more components of the device 308 or data from other devices of the system 300, for example.

The historical data storage 354 can store, maintain, or include any logged, past, or historical data either generated by one or more components of the device 308 or from other devices of the system 300, such as from the machine 316, one or more sessions 320, or the client device 312. For example, the historical data storage 354 can store raw data from the machine 316 indicative of the hardware performance of the machine 316 or raw data from individual session 320 indicative of the performance of the sessions 320. In some cases, the historical data storage 354 can store interaction data between the client device 312 and the machine 316 or session 320. In some cases, the historical data storage 354 can store certain application data, such as resource consumption, latency, etc. of the application indicative of the performance of the application.

The metric storage 358 can store, maintain, or include the metric generated or determined by at least the hardware analyzer 328. The metric storage 358 can store various metrics associated with individual machines 316. The metric storage 358 may be updated by the hardware analyzer 328, among other components of the device 308. In some cases, the metric storage 358 can store metrics received from the machines 316. The metric can be indicative of the performance (e.g., hardware performance) of the respective machine 316.

The score storage 362 can store, maintain, or include one or more scores generated by at least the hardware analyzer 328 or the session analyzer 332. For example, the score storage 362 can store a score indicative of the hardware performance, such as generated by the hardware analyzer 328 or obtained from the machine 316. In another example, the score storage 362 can store at least one of the application scores, sessions scores, combined scores, or UX scores. The application score can be indicative of the performance of the application. The session score can be indicative of the performance of the session 320. The combined score and the UX score can be indicative of the overall experiences of the user during usage of the session 320 or application on the session 320.

The threshold storage 366 can store, maintain, or include thresholds for usage by one or more components of the device 308. The thresholds may be predetermined or configured by the admin. For example, the threshold storage 366 can store the hardware threshold, score threshold, time interval thresholds, duration threshold, or other thresholds. The hardware threshold can be indicative of an overloaded or high resource consumption machine 316. The score threshold can be indicative session with poor UX. The time interval threshold can be indicative of the minimum number of time intervals corresponding between the machine 316 and the session 320 for flagging at least the machine 316. The duration threshold can be indicative of the duration of resource spikes, high resource consumption, or poor UX score for one or more components (e.g., hardware analyzer 328 or session analyzer 332) to consider the machine 316 or session 320 as failing the respective threshold for the time interval.

The action storage 370 can store, maintain, or include a list of actions supported by the machines 316 or sessions 320. The list of actions can include at least terminating a process, logging off a user, switching machine 316 to maintenance mode, capping a process, and rebooting the machine. The action storage 370 can include instructions or source codes associated with the respective actions, which can be used by the machine 316 or session 320 of the machine 316 for the execution of the action. The action storage 370 can be accessed by at least the action generator 340 to trigger an action. The action storage 370 can be accessed by the alert generator 344 to provide a recommended action for the admin within an alert.

Figure 4:
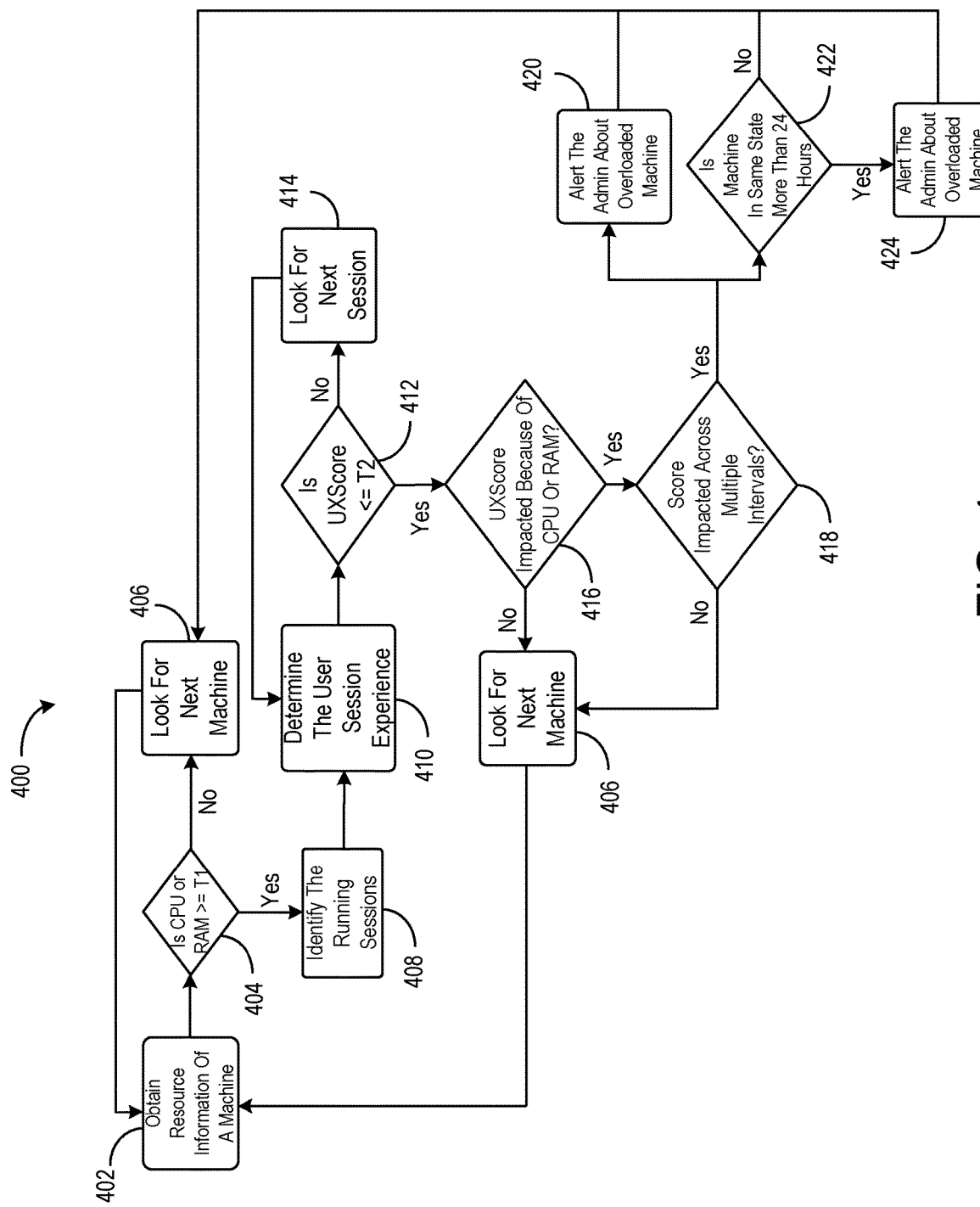
FIG. 4 is an example workflow diagram for identifying overloaded machines, in accordance with one or more implementations.

Referring to FIG. 4, depicted is an example workflow diagram 400 for identifying overloaded machines 316. The diagram 400 can various operations for correlating one or more sessions 320 the respective overloaded machines 316. The example diagram 400 can include operations, which can be executed, performed, or otherwise carried out by one or more components of the system 300 (e.g., device 308, machine 316, session 320, etc.), the computer 101, the cloud computing environment 214, or any other computing devices described herein in conjunction with FIGS. 1A-2C. For example, the operations can be performed by the device 308 to monitor the activities, events, or performances of the machine 316 or sessions 320 of the machine 316. In another example, the operations can be performed by the device 308 embedded as part of at least one machine 316.

At operation 402, the device 308 can obtain resource information of at least one machine 316. The resource information can include at least resource capacity (e.g., remaining resources of the CPU, RAM, etc.), resource consumption (e.g., CPU utilization, RAM utilization, etc.), latency, responsiveness, or other performance data of the machine 316. In this example, the device 308 can use the CPU or RAM as indicators of the hardware performance of the machine 316. At operation 404, the device 308 can determine whether the CPU or RAM is greater than or equal to a first threshold (e.g., hardware threshold). The first threshold can refer to an upper bound value or a cutoff point indicative of overloaded machine 316 or high resource consumption within the machine 316. If the CPU or RAM does not exceed or equate to the first threshold, the device 308 may look for the next machine, such as at operation 406. Hence, the device 308 can perform similar procedures for other machines 316, such as starting at operation 402.

If the CPU or RAM is greater than or equal to the first threshold, the device 308 can proceed to identify running sessions of the machine 316, such as at operation 408. The running sessions can refer to active sessions or existing sessions on the machine 316. The machine 316 can host one or more sessions 320. At operation 410, the device 308 can determine the user session experience (e.g., UX score) for individual sessions 320 of the machine 316 for correlation to the hardware performance of the machine 316. Upon determining the UX score, and at operation 412, the device 308 can determine whether the UX score is less than or equal to a second threshold (e.g., score threshold). If the UX score exceed the second threshold, the device 308 can determine that the session 320 has good UX, which is not impacted by the performance of the machine 316. Otherwise, if the UX score is below or equal to the second threshold, the device 308 can proceed to operation 416. In some cases, the device 308 can determine the UX score concurrent to the determination of the hardware performance of the machine 316. In some cases, such as in this example, the UX score determination may be subsequent to determining the hardware performance.

At operation 416, the device can determine whether the UX score is impacted because of or due to the hardware performance of the machine 316 (e.g., the CPU or RAM utilization in this example). For example, if the hardware performance fails the first threshold and the UX score fails the second threshold at the same time interval(s), the device 308 may determine that the hardware performance impacted the session performance, thereby affecting the UX in the session. In some cases, the device 308 can correlate the hardware performance to the UX score using other performance data of the machine 316 and individual sessions 320. If the UX score is impacted due to the hardware performance, the device 308 can proceed to operation 418. Otherwise, the device 308 can proceed to look for other machines 316 (or the next session 320 on the machine 316).

At operation 418, the device 308 can determine whether the score (e.g., UX score) is impacted by the hardware performance across multiple intervals (e.g., time intervals). For example, the device 308 can determine overlaps between one or more time intervals when the hardware performance fails the first threshold and when the UX score fails the second threshold. Based on the configuration of the administrator, the multiple intervals may be consecutive time intervals or a number of time intervals within a window of intervals (e.g., group of cycles), such as 8 time intervals in a window of 10 time intervals. Accordingly, if the UX score is impacted across multiple intervals, either a minimum number of time intervals or minimum overlaps of time intervals with unsatisfactory hardware performance, the device 308 can proceed to at least one of operation 420 or operation 422. Otherwise, the device can proceed to operation 406 or look for the next session (e.g., operation 414).

At operation 420, the device 308 can alert the administrator on the overloaded machine 316. The alert can be provided as a report, notification, email, etc. The device 308 can indicate one or more users or sessions 320 impacted by the overloaded machines 316. The device 308 may not alert the admin with machines 316 that have high resource consumption that does not affect one or more sessions 320. The device 308 may proceed to look for the next machine at operation 406. In some cases, the device 308 may proceed to operation 422 instead of operation 420.

At operation 422, the device 308 can determine whether the machine is in the same state for more than a time period (e.g., 24 hours in this example). For example, the device 308 may not immediately alert the administrator of the machine 316. Instead, the device 308 may pin or flag the machine 316 to determine whether the degraded performance of the machine hardware or session persist in a subsequent time period. In another example, the device 308 may initiate a first action (or one or more actions) to potentially improve the UX score or hardware performance over a time period. Hence, the device 308 can determine whether the machine is in the same state after the time period. If the machine is in the same state after the time period, the device 308 can proceed to operation 424. Otherwise, the device 308 can look for the next machine 316 (406), or end the operations, for example.

At operation 424, the device 308 can alert the administrator about the overloaded machine 316 in response to the machine state persisting over a time period. The device 308 can indicate to the admin the duration of poor hardware performance or poor UX score. In some cases, the device 308 can recommend an action (or additional action if a prior action has been taken) for the admin to select. In some cases, the device 308 may initiate an auto action based on a configuration by the admin. In this case, the device 308 can alert the admin of the triggered action. Accordingly, the device 308 can proceed to the next machine at operation 406, or end the operations for identifying overloaded machines.

Figure 5:
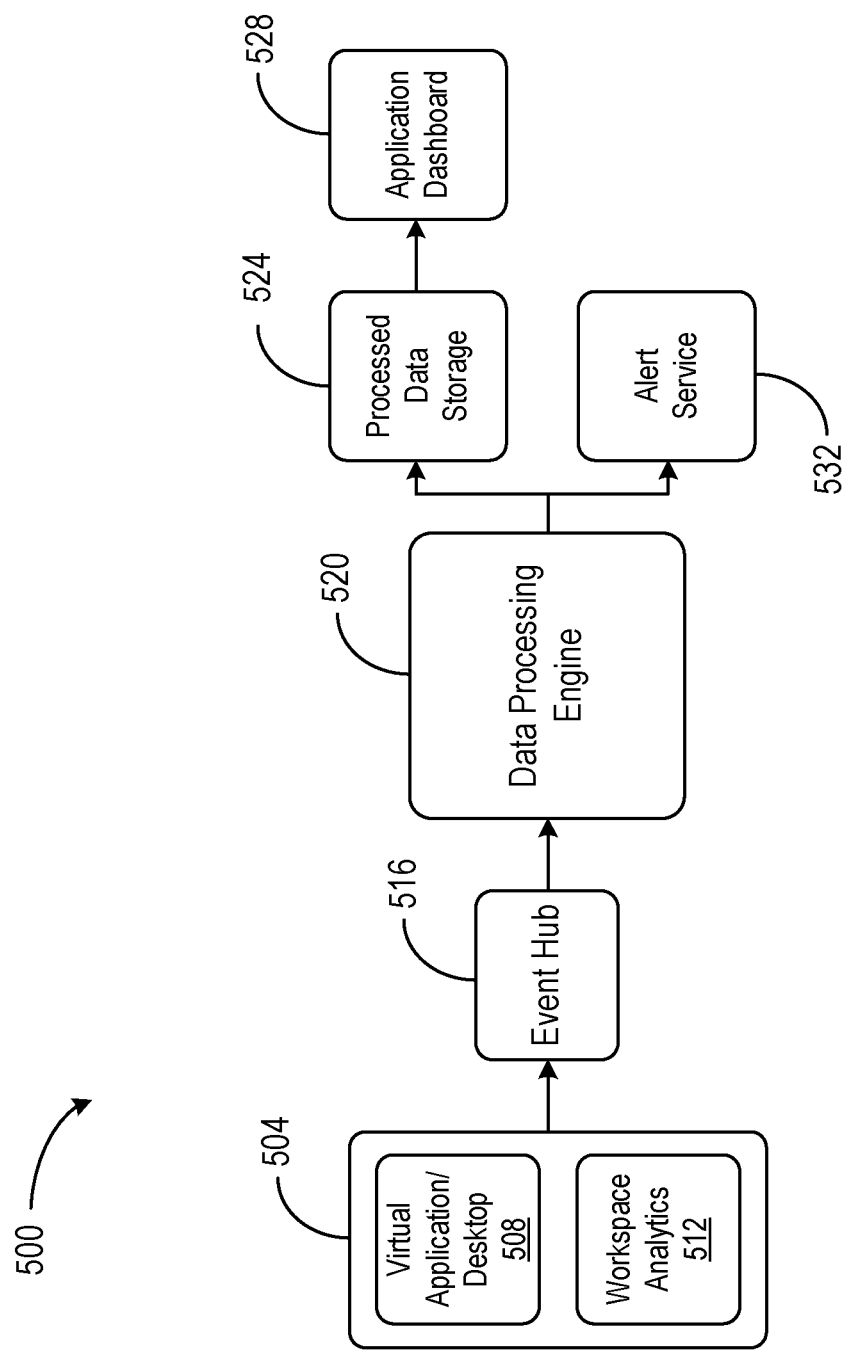
FIG. 5 is an example architectural diagram for alerting the overloaded machines, in accordance with one or more implementations.

Referring to FIG. 5, depicted an example architectural diagram 500 for alerting the overloaded machines. The diagram 500 can various operations for correlating one or more sessions 320 the respective overloaded machines 316. The example diagram 500 can include operations, which can be executed, performed, or otherwise carried out by one or more components of the system 300 (e.g., device 308, machine 316, session 320, etc.), the computer 101, the cloud computing environment 214, or any other computing devices described herein in conjunction with FIGS. 1A-2C. The diagram 500 can include one or more operations similar to the diagram 400 in conjunction with FIG. 4.

The diagram 500 can include at least one data source 504, at least one event hub 516, at least one data processing engine 520, at least one processed data storage 524, at least one application dashboard 528, and at least one alert service 532. The data source 504 can include at least a virtual application and desktop source 508 and a workspace analytics source 512. The virtual application and desktop source 508 can include event data, logged information, or historical data associated with one or more sessions 320 or applications executing on the machine 316. The workspace analytics source 512 can include historical data of the machines 316. The data from the one or more sources of the data source 506 can be used for determining the performance of at least the machine 316 or the sessions 320 of the machine 316.

The event hub 516 can obtain or receive data from the data source 504. The event hub 516 can represent a pipeline to stream or forward traffic from the data source 504 to the data processing engine 520. For example, the event hub 516 can be an intermediary device between the data source 504 and the data processing engine 520. In some cases, the data source 504 can be a remote entity from the event hub 516. In some cases, the data source 504 can be a part of the event hub 516. The event hub 516 may filter data based on the configuration from the data processing engine 520. For instance, the event hub 516 can filter certain data from the data source 504 that may not be used for determining the hardware performance of the machine 316 or the UX score for individual sessions 320. In some other cases, the event hub 516 may select a subset of data from the data source 504 to forward, such as resource consumption data, resource capacity data, latency data, failure rate, resiliency, a count of sessions 320 (e.g., number of sessions 320 for individual machines 316), or state of the machine 316 or session 320. In some cases, the event hub 516 may be included as part of the machine 316 or as an intermediary for the machine 316 to provide data to other devices, such as device 308.

The data processing engine 520 can receive or obtain data from the event hub 516. The data processing engine 520 can include, correspond to, or be a part of the device 308. For instance, the data processing engine 520 can perform one or more features or functionalities of one or more components (e.g., interface 324, hardware analyzer 328, session analyzer 332, impact detector 336, action generator 340, or alert generator 344) of the device 308. The data processing engine 520 may process the data from the data source 504. The data processing engine 520 can determine at least the hardware performance (e.g., CPU or RAM utilization) and the UX scores. The data processing engine 520 can correlate the hardware performance of the machine 316 to the UX score of sessions hosted on the machine 316. The data processing engine 520 can determine or identify whether the UX score is impacted due to the performance degradation of the machine 316. The data processing engine 520 can determine at least one action to trigger or perform on the machine 316 or one or more sessions 320. In some cases, the data processing engine 520 can determine which session 320 to take action on, such as session 320 with the highest resource consumption that may impact other sessions on the machine 316 or session with the lowest priority based on the account information. The data processing engine 520 can store the processed data in the processed data storage 524.

For example, the processed data storage 524 can store the data processed by the data processing engine 520 including at least hardware performance of the machine 316, at least one of interaction score, session score, combined score, or UX score of sessions 320, and impact information between the machine 316 and session 320. The processed data storage 524 can store responsiveness information or latency information (e.g., in milliseconds or seconds), failure rates (e.g., failure to launch applications or sessions 320), the resilience of the sessions 320 (e.g., avoidance of failures, interruptions, or crashes), logon duration, among other data from the data processing engine 520. The application dashboard 528 can provide a dashboard or an interface to the admin indicating overloaded machines 316 and sessions 320 or users impacted by the machine 316. The application dashboard 528 can provide a summary, details, or insights on the condition of the machine 316 and sessions 320 including any performance information. The application dashboard 528 can generate or obtain a pre-configured GUI to provide information to the admin.

In some cases, the data processing engine 520 can send a signal or instructions to the alert service 532. The alert service 532 can transmit an alert to one or more entities, such as a computing device of the admin or the client device 312. For example, the alert service 532 can alert the admin of the overloaded machines 316 that are impacting one or more respective sessions 320 on the machine 316. The alert service 532 can provide one or more options to the admin, such as displaying a dashboard (e.g., via the application dashboard 528) to receive information regarding the overloaded machine 316, selecting an action to perform, or performing auto-action procedures. In some cases, the alert service 532 can provide a GUI, push notification, email, text, or other mediums to alert the admin to take action. In some cases, the alert service 532 can alert the client device 312 logged into an existing session 320 or attempting to access a session 320. The alert service 532 can alert the user of ongoing maintenance, scheduled action (e.g., scheduled rebooting of the machine 316 or logging off session 320), ongoing action (e.g., capping one or more processes) performing on the session 320, or future action (e.g., transferring the session 320 to another machine 316 or terminating one or more processes executing on the session 320). In some cases, the dashboard generated or provided by the application dashboard 528 can be a part of the alert.

Figure 6:
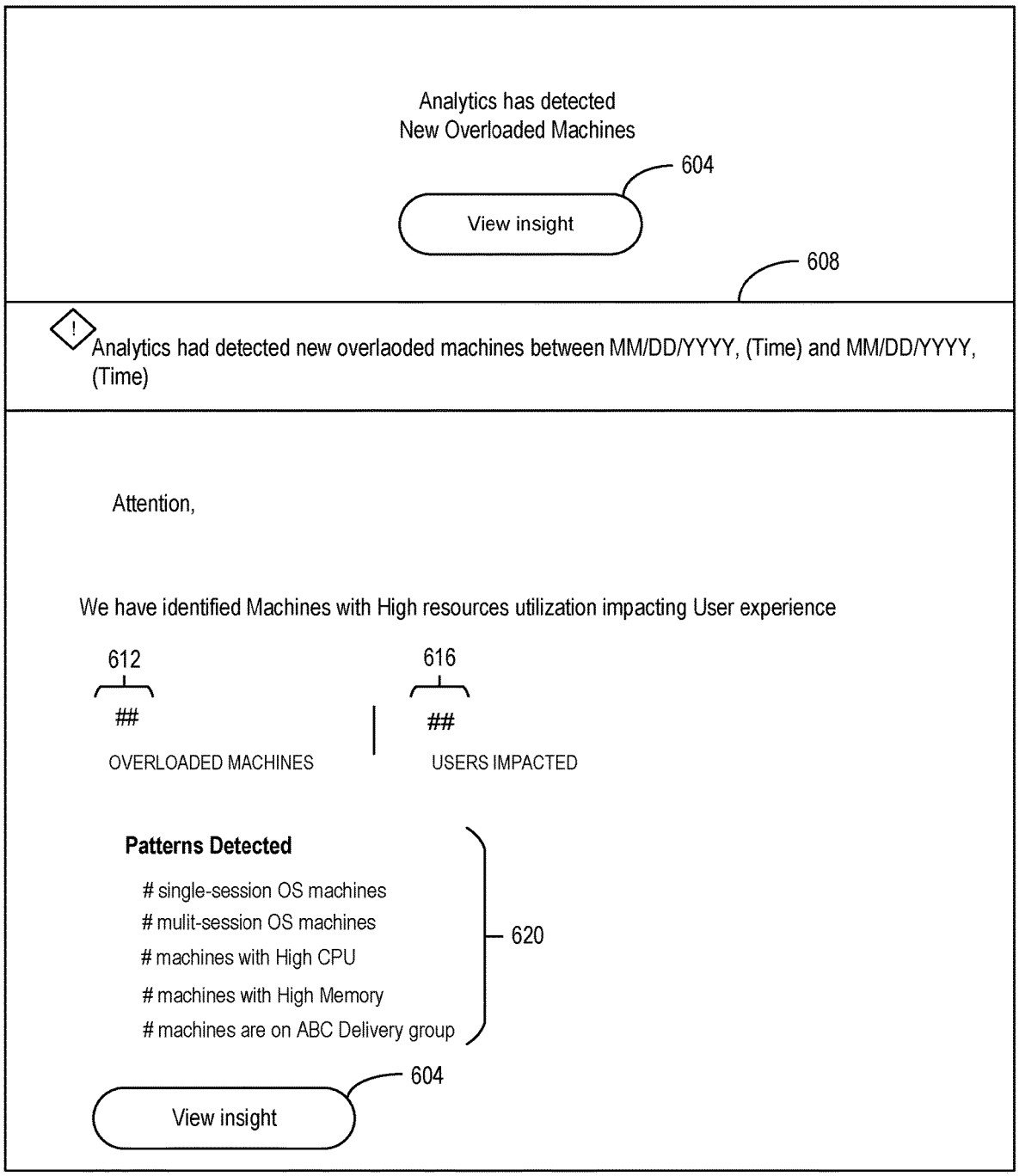
FIG. 6 is an example illustration of an alert received by an admin, in accordance with one or more implementations.

Referring to FIG. 6, depicted an example illustration of an alert 600 received by an admin. The alert 600 can include a GUI or report indicating one or more overloaded machines 316. The alert 600 can be generated by the device 308 based on historical data of the machine 316 and sessions 320. Upon generating the alert 600, the device 308 can provide the alert 600 to a remote device, such as an admin device. In some cases, at least a portion of the alert 600 can be preconfigured, such as the layout, phrases, or information to display. The layout of any elements in the alert 600 can be modified or configured by the admin. The alert 600 can include example information or alerts provided to the admin, but may include other information discussed herein. The alert 600 can provide a summary of one or more machines 316 recommended or suggested for an action.

The alert 600 can include one or more interactive elements. For instance, the alert 600 can include a button 604 to view insights or other detailed reporting on overloaded machines 316 and impact on the users. Upon interaction with button 604, the device 308 may provide a second alert or a report to the admin. The second alert can include additional information than the information presented in the alert 600. For instance, the second alert can include at least machine identifier, session identifier, UX score associated with the session 320, occurrences of the hardware performance impacting the UX score, the status of the machine 316 or session 320 (e.g., performance, latency, active processed, etc.), one or more suggested actions, historical actions taken on the machine 316 or session 320, event data of the session 320, resource consumption by individual session 320, among other information configurable by the admin.

The alert 600 can include a message 608 indicating that the device 308 or software detects new overloaded machines 316 that impacts one or more session UX. The message 608 can include a range between a first time and a second time the analysis was performed for the machine 316. The alert 600 can include a number of overloaded machines 316 (612). The alert 600 can include the number of users impacted by the overloaded machines 316 (616). In this case, the users can correspond to individual sessions 320 on the machines 316.

The alert 600 can include certain patterns detected by the device 308. For instance, the pattern can include a count of at least single session machines 316 impacted, multi-session machines 316 impacted, machines 316 with high CPU (e.g., CPU utilization above a threshold), machines 316 with high memory (e.g., RAM utilization above a threshold), or machines 316 that are part of certain delivery group. The delivery group can include one or more machines 316 selected from a machine listing. In some cases, the admin can configure the one or more machines 316 to certain delivery groups based on the information of the individual machines 316, such as hardware performance, a number of sessions 320 allowed on the machine, single-session or multi-session machines 316, etc.

Figure 7:
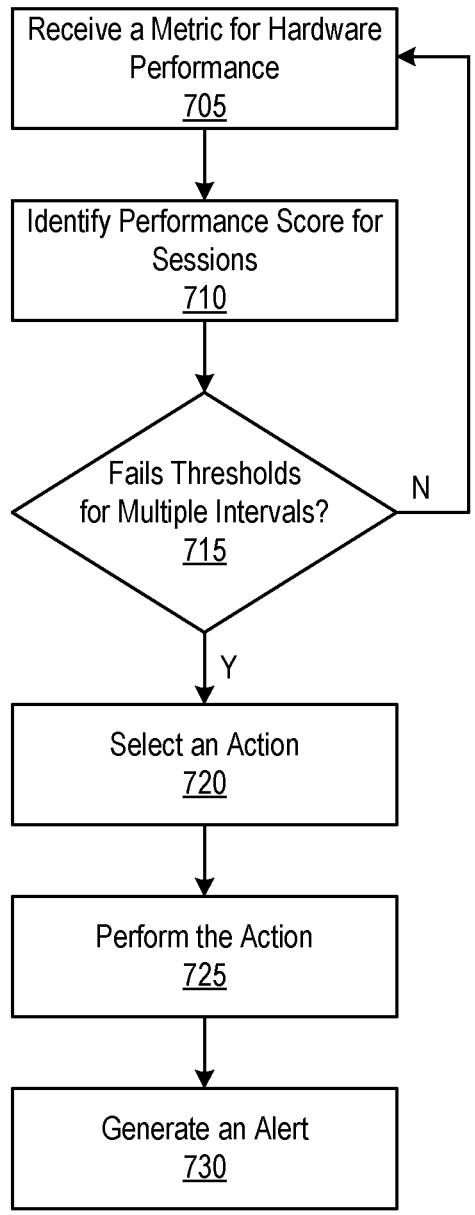
FIG. 7 is an example flow diagram of a method for alerting admins about overloaded machines, in accordance with one or more implementations.

FIG. 7 illustrates an example flow diagram of a method 700 for alerting admins about overloaded machines. The example method 700 can be executed, performed, or otherwise carried out by one or more components of the system 300 (e.g., device 308, client device 312, machine 316, etc.), the computer 101, the cloud computing environment 214, or any other computing devices described herein in conjunction with FIGS. 1A-2C. The method 700 can include receiving a metric for hardware performance, at step 705. At step 710, the method 700 can include identifying a performance score for sessions. At step 715, the method 700 can include determining whether the metric and performance score fails the respective thresholds for multiple intervals. At step 720, the method 700 can include selecting an action. At step 725, the method 700 can include performing the action. At step 730, the method 700 can include generating an alert.

Still referring to FIG. 7 in further detail, at step 705, the device can receive a metric for hardware performance, at step 705. The metric can be indicative of the performance of hardware (e.g., hardware performance) of a machine. The machine can host one or more sessions between various client devices, such as a single-session machine or multi-session machine. In some cases, the machine can generate the metric. In some cases, the device can generate the metric using data from the machine. The device can receive the metric for various time intervals, which can represent various time ranges, such as 1-minute, 2-minutes, 5-minutes, or other time ranges.

The metric of hardware performance can be based on at least one of an aggregated CPU consumption (e.g., CPU utilization), an aggregated memory consumption (e.g., RAM utilization), a predetermined number of resource spikes for the time intervals, or a number of available sessions of the machine. The metric can reflect the status or degradation of the machine. For example, the metric can indicate an average resource consumption, a number of resource spikes, duration of the spikes, or an average number of sessions within one or more time intervals. Aggregated information can include the mean, median, mode, ratio, 1% low, 1% high, or other aggregation techniques of the data.

At step 710, the device can identify, obtain, or determine performance scores of sessions. The performance scores can refer to scores indicative of the performance of sessions, which can include at least one of an interaction score of an application, session score, combined score, or the UX score. The device can identify the score for various time intervals, such as at similar time intervals as the metric. For example, the score can correspond to a UX score that is based on at least one of a resource utilization of the session, the responsiveness of the session, logon duration of the session, number of failures (e.g., failure rate) of the session, etc. The device can compare the performance scores of the sessions to the hardware performance of the machine during the various time intervals.

At step 715, the device can determine whether the metric and performance score fails the respective thresholds for multiple intervals. For example, the device can compare the metric to a first threshold (e.g., hardware threshold) and the performance score to a second threshold (e.g., score threshold). The first threshold can correspond to the availability of the hardware (e.g., resource capacity or resource consumption) for a predetermined number of time intervals. The second threshold can correspond to satisfactory session performance, such as for the same predetermined number of time intervals as the metric.

For instance, the device can compare time intervals at which the metric fails the first threshold and the performance score fails the second threshold. The time intervals can be within the same one or more windows (e.g., group of time intervals). The device can consider the metric and the performance score as failing the thresholds for multiple intervals if the number of overlapping time intervals (e.g., when failing the thresholds) are consecutive for a predetermined number of times or within the predetermined number of time intervals within a window. For example, each of the predetermined number of time intervals (e.g., when the metric and performance score fails the thresholds) can be consecutive to one another to represent the hardware performance impact on the UX score. In another example, the device can identify a number of a ratio of failures or unsatisfactory performance of the metric and performance score in a given window.

Hence, if the metric and the performance score fail the respective thresholds for multiple time intervals, the device can proceed to step 720. Otherwise, the device can identify other machines to assess and revert to step 705. In some cases, the device can receive the metric prior to identifying the performance score. For instance, the device may not analyze one or more sessions unless the metric fails the first threshold for a predetermined number of time intervals (e.g., consecutive or within a window). In other cases, the device can receive the metric concurrent to or while identifying the performance score. For example, the device can analyze the session for any machine without the metric failing the first threshold.

At step 720, the method 700 can include selecting an action. Selecting the action can be in response to or as part of triggering an action. For example, the device can trigger an action to perform on the machine or one or more sessions in response to failing the thresholds for multiple time intervals. The metric of hardware performance may fail the first threshold and the score may fail the second threshold for the device to trigger an action. In some cases, triggering the action can be responsive to at least one session of the machine being the same session corresponding to at least one of the scores failing the second threshold for the predetermined number of time intervals. For example, the failing of the threshold for the predetermined number of time intervals may apply to the same sessions (e.g., same session identifier). Performance scores of different sessions failing the second threshold may not be aggregated with one another. Hence, this can reflect individual sessions impacted by the machine performance. In some other cases, if a session is replaced by another session (e.g., transferred between machines) or a session is terminated at the same as another session is generated, the same session may be used to reflect the same time intervals for comparison with the metric failures.

In some cases, the device can trigger the action responsive to a correlation between the metric and the scores. Without the correlation, the device may not flag the machine or sessions. For instance, the device may not flag an overloaded machine without impact to one or more sessions. In some cases, the admin can configure the number of sessions that should be impacted to flag the machine for multi-session machine. For example, the device can flag overloaded machines impacting a single session or multiple sessions. In some cases, the overloaded machine may not impact one or more sessions executing on the machine.

In some cases, the device can determine to switch the machine to maintenance mode. In maintenance mode, the machine can reject subsequent requests to establish sessions on the machine. The device may select to switch to maintenance mode due to a high number of sessions in the machine or high computing resource consumption, for example. In some cases, the device may restrict resources of or terminate one or more processes on one or more sessions based on resource consumption by the respective sessions. The device may determine to restrict the resources of the one or more processes for sessions contributing the most to the resource consumption of the resource of the machine. Further, the device may terminate one or more processes that are idled for a prolonged period of time (e.g., 1 hour, 2 hours, etc.). Restricting resources or terminating one or more processes can maintain a level of resource consumption or reduce the load on the machine. Therefore, the machine can allocate additional resources to other sessions, for example.

The device may select to transfer one or more sessions to a second machine different from the machine with performance degradation. In this case, the device may transfer one or more sessions most impacted by the hardware performance degradation, sessions consuming the most resources, or sessions selected by the administrator. In some cases, the device may determine to reboot the session or machine. Rebooting the session can refer to logging off the session and reinitiating the session. The device may determine to reboot the machine, for example, if a predetermined number of sessions or a ratio of sessions experiences poor UX (e.g., 10 out of 12 sessions, 20 out of 30 sessions, etc.). In some cases, the device may determine to reboot the machine upon determining that at least one historical action does not improve the UX score for one or more sessions. In some cases, the device can select one or more actions based on historical actions performed on one or more machines, which yielded improvement to the UX score, session performance, or hardware performance of the machine.

At step 725, the device can perform the action. The device can perform the action responsive to triggering the action or selecting the action. In some cases, performing the action can be a part of triggering the action. For instance, the device can switch the machine to a maintenance mode. The device can restrict the resources for one or more processes executing on at least one session on the machine. The device can terminate the one or more processes executing on at least one session on the machine. The device can transfer one or more sessions to a second machine hosting a different group of sessions. The device can reboot at least one session or the machine hosting the sessions.

In some cases, the device can determine that the metric fails the first threshold and the performance score fails the second threshold in a second predetermined number of time intervals. In this example, the second predetermined can refer to a subsequent time intervals to a first predetermined time intervals when triggering the action, which is subsequent to executing the action. The device can determine that the prior action does not improve the impact of the hardware performance on the UX score at least to a satisfactory level. For instance, at the second predetermined time intervals, the device can identify that the metric fails the first threshold for a second time intervals, and the score fails the second threshold for the same second time intervals subsequent to triggering the first action. Accordingly, the device can trigger, responsive to the determination of persistent poor UX score, a second action to perform on the machine or one or more sessions. The second action may be different from the first action. For example, the device may switch the machine to maintenance mode, cap one or more processes, terminate one or more processes, or transfer at least one session to another machine as a first action. If no satisfactory improvement to one or more session UX, the device may initiate a reboot to the machine or sessions with poor UX.

At step 730, the device can generate, trigger, or provide an alert. The device can provide the alert to at least the admin or the user. The device can provide the alert as a GUI, email, notification, etc. The device can provide the alert to the admin to request an action to be performed on one or more machines or sessions. In some cases, the device may alert the admin that action is scheduled or executing on the machine or session. In some cases, the device can provide an alert to the admin of the result of taking the action, such as improvement on the metric of hardware performance or UX score of the users. The device may alert the user of ongoing, scheduled, or past actions performed on the session, for example.

Further Example Embodiments

The following examples pertain to further embodiments, from which numerous permutations and configurations will be apparent.

Example 1 includes a method including receiving, by a device, for a plurality of time intervals, a metric of performance of hardware of a machine hosting a plurality of sessions between a plurality of clients; identifying, by the device, for the plurality of time intervals, a plurality of scores indicative of performance of the corresponding plurality of sessions; and triggering, by the device, an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals.

Example 2 includes the subject matter of Example 1, wherein each of the predetermined number of time intervals are consecutive to one another, comprising: triggering, by the device, the action responsive to a correlation between the metric of performance of hardware and the plurality of scores.

Example 3 includes the subject matter of any of Examples 1 and 2, wherein the metric of performance of hardware is based on at least one of an aggregated CPU consumption, an aggregated memory consumption, a predetermined number of resource spikes for the plurality of time intervals, or a number of available sessions of the machine.

Example 4 includes the subject matter of any of Examples 1 through 3, comprising: switching, by the device responsive to triggering the action, the machine to a maintenance mode in which the machine rejects subsequent requests to establish sessions on the machine.

Example 5 includes the subject matter of any of Examples 1 through 4, comprising: restricting, by the device responsive to the triggering of the action, resources for one or more processes executing on the at least one of the plurality of sessions on the machine; or terminating, by the device, the one or more processes executing on the at least one of the plurality of sessions on the machine.

Example 6 includes the subject matter of any of Examples 1 through 5, comprising: transferring, by the device responsive to the triggering the action, one or more of the plurality of sessions to a second machine hosting a second plurality of sessions.

Example 7 includes the subject matter of any of Examples 1 through 6, comprising: rebooting, by the device responsive to the triggering the action, the at least one of the plurality of sessions or the machine hosting the plurality of sessions.

Example 8 includes the subject matter of any of Examples 1 through 7, further comprising: determining, by the device for a second predetermined number of time intervals that are subsequent to the predetermined number of time intervals and subsequent to executing the action, that i) the metric of performance of hardware fails the first threshold for a second predetermined number of time intervals of a second plurality of time intervals, and ii) the at least one of the plurality of scores fails the second threshold for the same second predetermined number of time intervals subsequent to triggering the action; and triggering, by the device, responsive to the determination, a second action to perform on the machine or one or more of the plurality of sessions, the second action different from the action.

Example 9 includes the subject matter of any of Examples 1 through 8, wherein triggering the action is further responsive to the at least one of the plurality of sessions being the same session corresponding to the at least one of the plurality of scores failing the second threshold for the same predetermined number of time intervals.

Example 10 includes the subject matter of any of Examples 1 through 9, wherein the plurality of scores correspond to a user experience score that is based on at least one of a resource utilization of a respective session, a responsiveness of the session, a logon duration of the session, or a number of failures of the session.

Example 11 includes a system including a device comprising one or more processors, coupled to memory, configured to: receive, for a plurality of time intervals, a metric of performance of hardware of a machine hosting a plurality of sessions between a plurality of clients; identify, for the plurality of time intervals, a plurality of scores indicative of performance of the corresponding plurality of sessions; and trigger an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals.

Example 12 includes the subject matter of Example 11, wherein each of the predetermined number of time intervals are consecutive to one another, and wherein the device is further configured to: trigger the action responsive to a correlation between the metric of performance of hardware and the plurality of scores.

Example 13 includes the subject matter of any of Examples 11 and 12, wherein the metric of performance of hardware is based on at least one of an aggregated CPU consumption, an aggregated memory consumption, a predetermined number of resource spikes for the plurality of time intervals, or a number of available sessions of the machine.

Example 14 includes the subject matter of any of Examples 11 through 13, wherein the device is further configured to: switch, responsive to triggering the action, the machine to a maintenance mode in which the machine rejects subsequent requests to establish sessions on the machine.

Example 15 includes the subject matter of any of Examples 11 through 14, wherein the device is further configured to: restrict, responsive to the triggering of the action, resources for one or more processes executing on the at least one of the plurality of sessions on the machine; or restrict, responsive to the triggering of the action, the one or more processes executing on the at least one of the plurality of sessions on the machine.

Example 16 includes the subject matter of any of Examples 11 through 15, wherein the device is further configured to: transfer, responsive to the triggering the action, one or more of the plurality of sessions to a second machine hosting a second plurality of sessions.

Example 17 includes the subject matter of any of Examples 11 through 16, wherein the device is further configured to: reboot, responsive to the triggering the action, the at least one of the plurality of sessions or the machine hosting the plurality of sessions.

Example 18 includes the subject matter of any of Examples 11 through 17, wherein the device is further configured to: determine, for a second predetermined number of time intervals that are subsequent to the predetermined number of time intervals and subsequent to executing the action, that i) the metric of performance of hardware fails the first threshold for a second predetermined number of time intervals of a second plurality of time intervals, and ii) the at least one of the plurality of scores fails the second threshold for the same second predetermined number of time intervals subsequent to triggering the action; and trigger, responsive to the determination, a second action to perform on the machine or one or more of the plurality of sessions, the second action different from the action.

Example 19 includes a non-transitory computer readable storage medium storing instructions that, when executed by one or more processors, cause the one or more processors to: receive, for a plurality of time intervals, a metric of performance of hardware of a machine hosting a plurality of sessions between a plurality of clients; identify, for the plurality of time intervals, a plurality of scores indicative of performance of the corresponding plurality of sessions; and trigger an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals.

Example 20 includes the subject matter of Example 19, wherein the instructions that, when executed by the one or more processors, cause the one or more processors to perform at least one of: switch, responsive to triggering the action, the machine to a maintenance mode in which the machine rejects subsequent requests to establish sessions on the machine; restrict, responsive to the triggering the action, resources for one or more processes executing on the at least one of the plurality of sessions on the machine; terminate, responsive to the triggering the action, the one or more processes executing on the at least one of the plurality of sessions on the machine; transfer, responsive to the triggering the action, one or more of the plurality of sessions to a second machine hosting a second plurality of sessions; or reboot, responsive to the triggering the action, the at least one of the plurality of sessions or the machine hosting the plurality of sessions.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method, comprising:

receiving, by a device, for a plurality of time intervals, a metric of performance of hardware of a machine hosting a plurality of sessions between a plurality of clients;

identifying, by the device, for the plurality of time intervals, a plurality of scores indicative of performance of the corresponding plurality of sessions;

triggering, by the device, an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals; and performing one or more of the following steps:

switching, by the device responsive to triggering the action, the machine to a maintenance mode in which the machine rejects subsequent requests to establish sessions on the machine;

restricting, by the device responsive to the triggering of the action, resources for one or more processes executing on the at least one of the plurality of sessions on the machine;

terminating, by the device, the one or more processes executing on the at least one of the plurality of sessions on the machine;

transferring, by the device responsive to the triggering the action, one or more of the plurality of sessions to a second machine hosting a second plurality of sessions; and rebooting, by the device responsive to the triggering the action, the at least one of the plurality of sessions or the machine hosting the plurality of sessions.

2. The method of claim 1, wherein each of the predetermined number of time intervals are consecutive to one another, comprising:
triggering, by the device, the action responsive to a correlation between the metric of performance of hardware and the plurality of scores.

3. The method of claim 1, wherein the metric of performance of hardware is based on at least one of an aggregated CPU consumption, an aggregated memory consumption, a predetermined number of resource spikes for the plurality of time intervals, or a number of available sessions of the machine.

4. The method of claim 1, further comprising:
determining, by the device for a second predetermined number of time intervals that are subsequent to the predetermined number of time intervals and subsequent to executing the action, that i) the metric of performance of hardware fails the first threshold for a second predetermined number of time intervals of a second plurality of time intervals, and ii) the at least one of the plurality of scores fails the second threshold for the same second predetermined number of time intervals subsequent to triggering the action; and
triggering, by the device, responsive to the determination, a second action to perform on the machine or one or more of the plurality of sessions, the second action different from the action.

5. The method of claim 1, wherein triggering the action is further responsive to the at least one of the plurality of sessions being the same session corresponding to the at least one of the plurality of scores failing the second threshold for the same predetermined number of time intervals.

6. The method of claim 1, wherein the plurality of scores correspond to a user experience score that is based on at least one of a resource utilization of a respective session, a responsiveness of the session, a logon duration of the session, or a number of failures of the session.

7. A system, comprising:
a device comprising one or more processors, coupled to memory, configured to:
receive, for a plurality of time intervals, a metric of performance of hardware of a machine hosting a plurality of sessions between a plurality of clients;
identify, for the plurality of time intervals, a plurality of scores indicative of performance of the corresponding plurality of sessions;
trigger an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals; and
further configured to perform one or more of the following actions:
switch, responsive to triggering the action, the machine to a maintenance mode in which the machine rejects subsequent requests to establish sessions on the machine;
restrict, responsive to the triggering of the action, resources for one or more processes executing on the at least one of the plurality of sessions on the machine;
restrict, responsive to the triggering of the action, the one or more processes executing on the at least one of the plurality of sessions on the machine;
transfer, responsive to the triggering the action, one or more of the plurality of sessions to a second machine hosting a second plurality of sessions; and
reboot, responsive to the triggering the action, the at least one of the plurality of sessions or the machine hosting the plurality of sessions.

8. The system of claim 7, wherein each of the predetermined number of time intervals are consecutive to one another, and wherein the device is further configured to:
trigger the action responsive to a correlation between the metric of performance of hardware and the plurality of scores.

9. The system of claim 7, wherein the metric of performance of hardware is based on at least one of an aggregated CPU consumption, an aggregated memory consumption, a predetermined number of resource spikes for the plurality of time intervals, or a number of available sessions of the machine.

10. The system of claim 7, wherein the device is further configured to:
determine, for a second predetermined number of time intervals that are subsequent to the predetermined number of time intervals and subsequent to executing the action, that i) the metric of performance of hardware fails the first threshold for a second predetermined number of time intervals of a second plurality of time intervals, and ii) the at least one of the plurality of scores fails the second threshold for the same second predetermined number of time intervals subsequent to triggering the action; and
trigger, responsive to the determination, a second action to perform on the machine or one or more of the plurality of sessions, the second action different from the action.

11. A non-transitory computer readable storage medium storing instructions that, when executed by one or more processors, cause the one or more processors to:
receive, for a plurality of time intervals, a metric of performance of hardware of a machine hosting a plurality of sessions between a plurality of clients;
identify, for the plurality of time intervals, a plurality of scores indicative of performance of the corresponding plurality of sessions; and
trigger an action to perform on the machine or at least one of the plurality of sessions responsive to i) the metric of performance of hardware failing a first threshold corresponding to availability of the hardware for a predetermined number of time intervals of the plurality of time intervals, and ii) the at least one of the plurality of scores failing a second threshold corresponding to satisfactory session performance for the same predetermined number of time intervals; and
performing one or more of the following actions:
switch, responsive to triggering the action, the machine to a maintenance mode in which the machine rejects subsequent requests to establish sessions on the machine;
restrict, responsive to the triggering the action, resources for one or more processes executing on the at least one of the plurality of sessions on the machine;

terminate, responsive to the triggering the action, the one or more processes executing on the at least one of the plurality of sessions on the machine;
transfer, responsive to the triggering the action, one or more of the plurality of sessions to a second machine hosting a second plurality of sessions; or
reboot, responsive to the triggering the action, the at least one of the plurality of sessions or the machine hosting the plurality of sessions.

\* \* \* \* \*